(12) United States Patent
Lamontagne et al.

(10) Patent No.: US 10,600,072 B2
(45) Date of Patent: Mar. 24, 2020

(54) SYSTEM AND METHOD FOR QUALIFYING EVENTS BASED ON BEHAVIORAL PATTERNS AND TRAITS IN DIGITAL ENVIRONMENTS

(71) Applicant: Trivver, Inc., Huntington Beach, CA (US)

(72) Inventors: Joel David Lamontagne, Huntington Beach, CA (US); Mozelle Thompson, Washington, DC (US); Richard Watson, Fountain Valley, CA (US); Simon Keating, Aldershot Hampshire (GB); Lee Evans, Los Angeles, CA (US); Timothy Isaac, Brea, CA (US); Andrew Williams, Beckenham Kent (GB)

(73) Assignee: Trivver, Inc., Huntington Beach, CA (US)

( * ) Notice: Subject to any disclaimer, the term of this patent is extended or adjusted under 35 U.S.C. 154(b) by 0 days.

(21) Appl. No.: 14/010,116

(22) Filed: Aug. 26, 2013

(65) Prior Publication Data
US 2014/0114742 A1    Apr. 24, 2014

Related U.S. Application Data

(60) Provisional application No. 61/693,554, filed on Aug. 27, 2012.

(51) Int. Cl.
*G06Q 30/02* (2012.01)

(52) U.S. Cl.
CPC .............. *G06Q 30/0242* (2013.01)

(58) Field of Classification Search
None
See application file for complete search history.

(56) References Cited

U.S. PATENT DOCUMENTS

| | | | |
|---|---|---|---|
| 6,828,966 B1 | 12/2004 | Gavriliu et al. | |
| 8,328,640 B2 * | 12/2012 | Rom et al. | 463/42 |
| 8,333,659 B2 * | 12/2012 | Driemeyer et al. | 463/29 |
| 8,485,897 B1 * | 7/2013 | Marsland | H04L 67/38 463/31 |
| 8,574,074 B2 * | 11/2013 | van Datta et al. | 463/33 |
| 9,443,352 B1 | 9/2016 | Glover et al. | |
| 2002/0033845 A1 | 3/2002 | Elber et al. | |
| 2006/0287105 A1 | 12/2006 | Willis | |
| 2007/0060345 A1 | 3/2007 | Edwards | |
| 2007/0060346 A1 | 3/2007 | Edwards | |
| 2007/0072676 A1 | 3/2007 | Baluja | |
| 2007/0078706 A1 | 4/2007 | Datta et al. | |
| 2009/0138813 A1 | 5/2009 | LaMontagne | |

(Continued)

*Primary Examiner* — Alexandru Cirnu
(74) *Attorney, Agent, or Firm* — Chhabra Law Firm, PC

(57) ABSTRACT

A device that analyzes advertising effectiveness can include an asset repository that stores a plurality of smart objects, an entertainment interface that accepts one or more smart objects from the plurality of smart objects, an event stream processor that receives information from the one or more smart objects and provides metrics based on the information from the one or more smart objects, and a BIND engine that receives information from the one or more smart objects and one or more databases and provides decisions and metrics based on the information from the one or more smart objects and one or more databases.

18 Claims, 17 Drawing Sheets

(56) References Cited

U.S. PATENT DOCUMENTS

| | | |
|---|---|---|
| 2010/0030640 A1 | 2/2010 | van Datta et al. |
| 2010/0217666 A1 | 8/2010 | Belenguer |
| 2010/0306039 A1* | 12/2010 | Green .................... G06Q 30/02 705/14.4 |
| 2013/0158965 A1 | 6/2013 | Beckman |
| 2014/0149903 A1 | 5/2014 | Ahn et al. |
| 2015/0035822 A1 | 2/2015 | Arsan et al. |
| 2015/0035823 A1 | 2/2015 | Arsan et al. |
| 2016/0293133 A1 | 10/2016 | Dutt |
| 2017/0132567 A1 | 5/2017 | Glunz |
| 2017/0228943 A1 | 8/2017 | Arsan et al. |

* cited by examiner

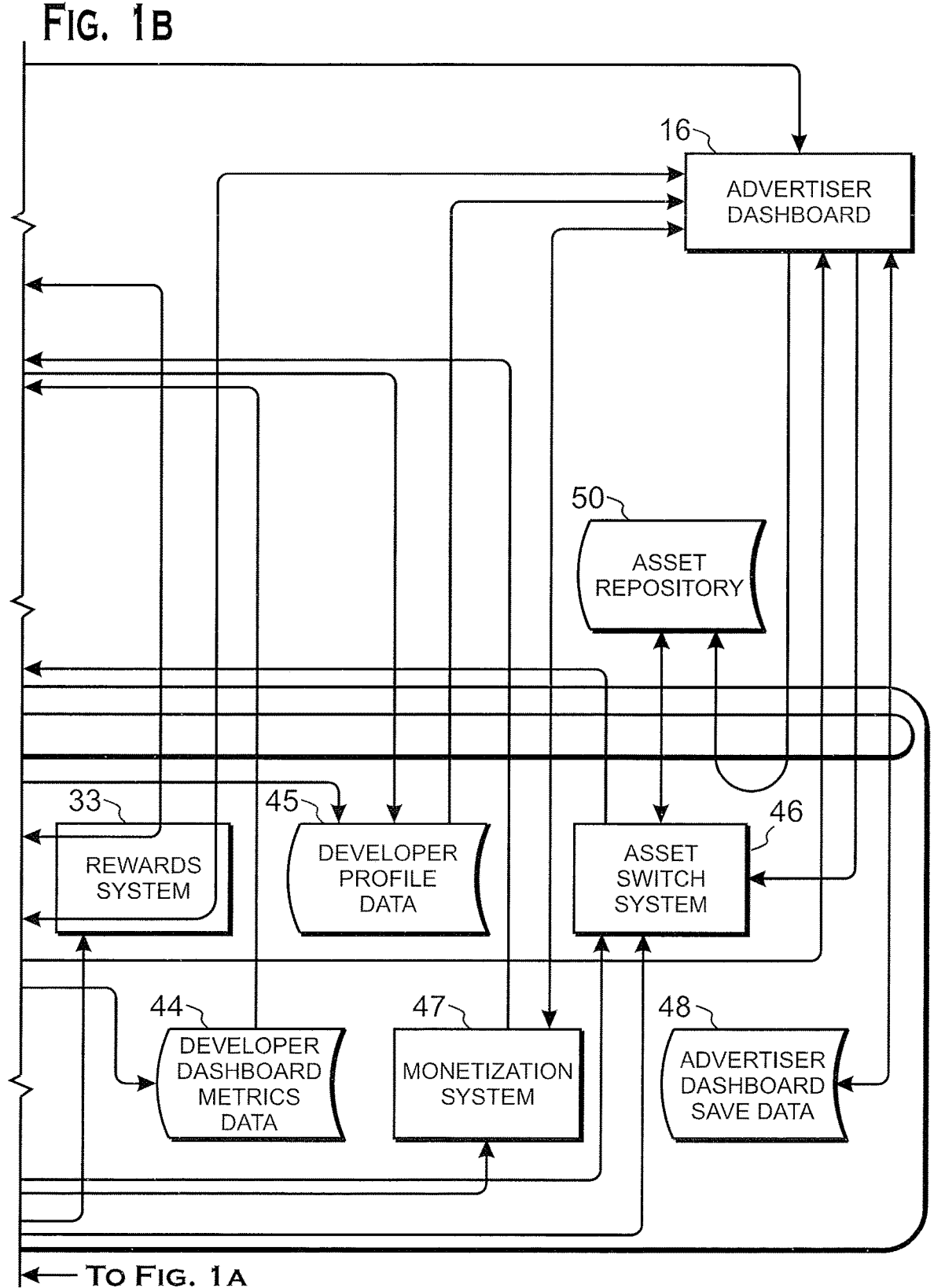

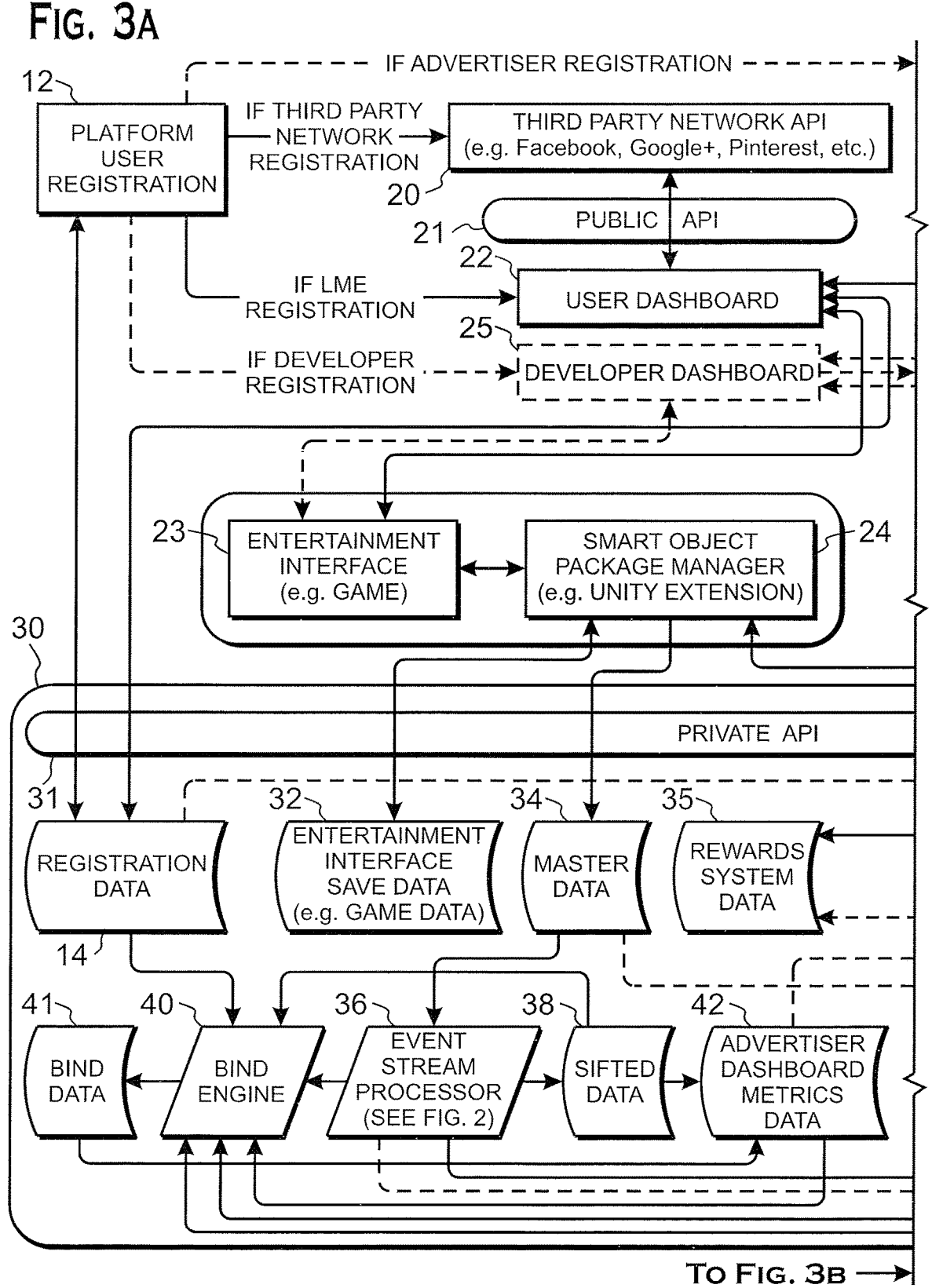

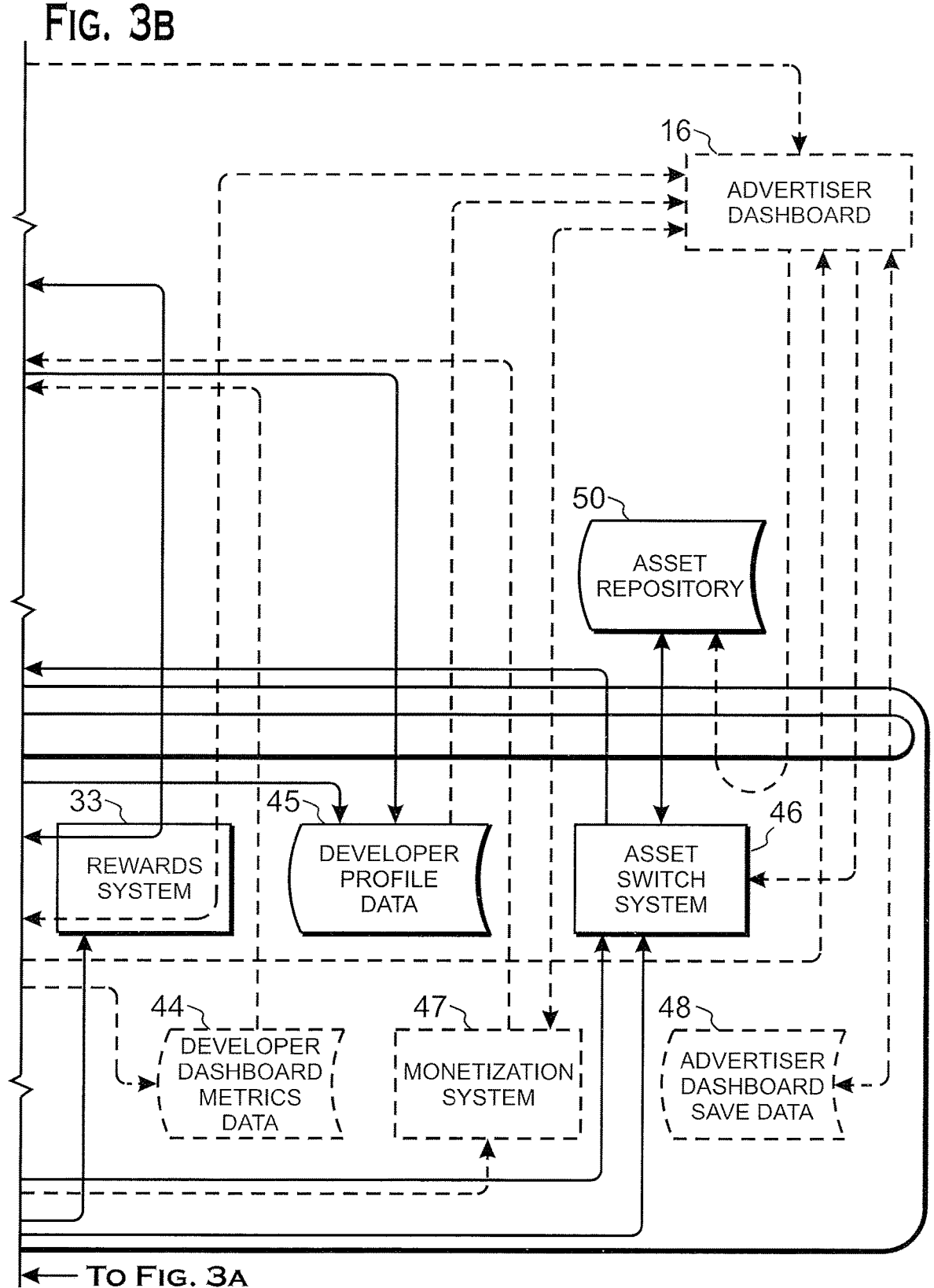

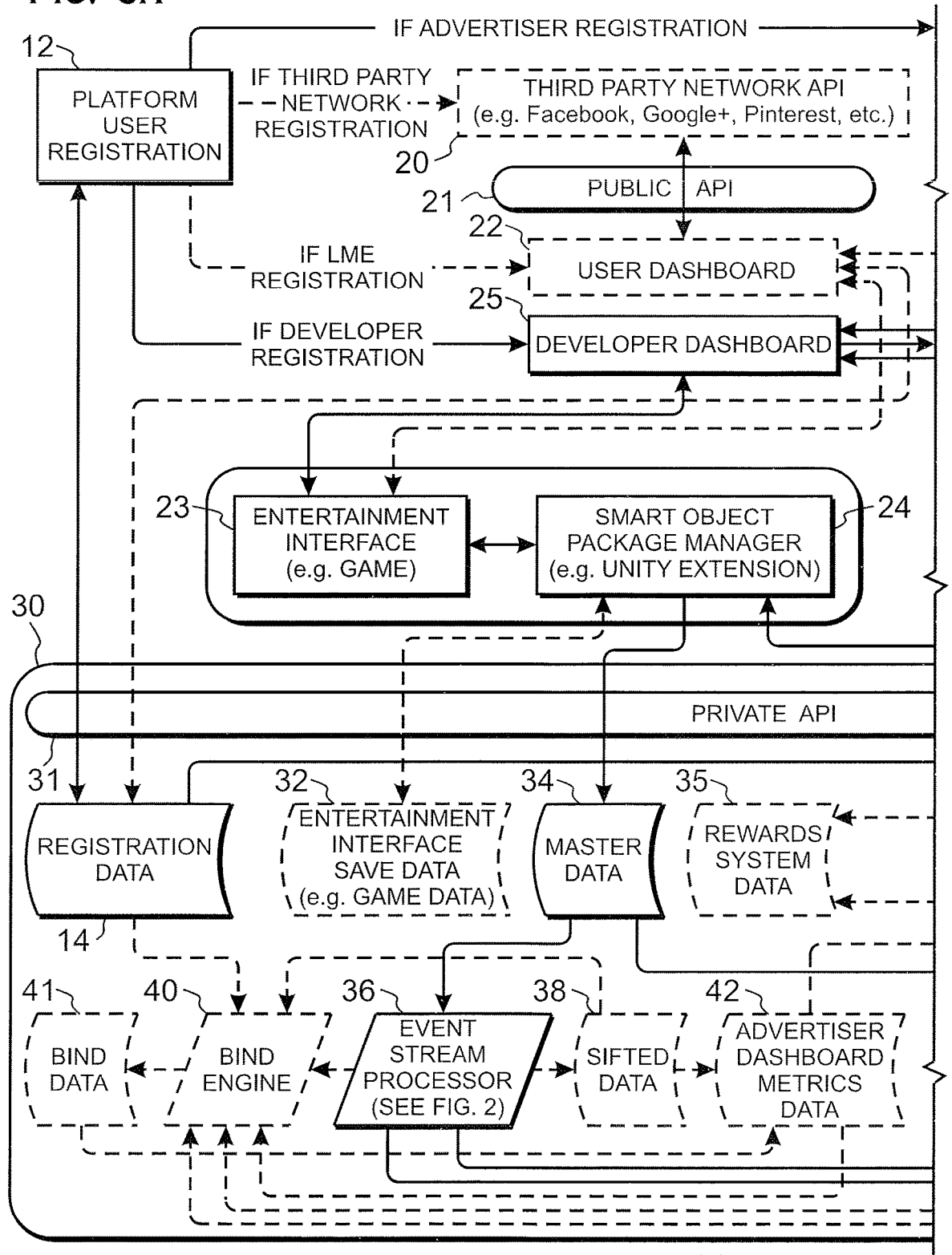

SYSTEM AND METHOD FOR QUALIFYING EVENTS BASED ON BEHAVIORAL PATTERNS AND TRAITS IN DIGITAL ENVIRONMENTS

CROSS-REFERENCE TO RELATED APPLICATIONS

The present Application claims priority to the U.S. Provisional Application with the Ser. No. 61/693,554 filed on Aug. 27, 2012, the entire contents herewith incorporated by reference.

FIELD OF THE INVENTION

The present disclosure relates to a system and a method of analyzing advertising effectiveness. More particularly, the present disclosure relates to a system and a method of analyzing advertising effectiveness through a digital environment.

BACKGROUND

In the discussion of the background that follows, reference is made to certain structures, systems, and/or methods. However, the following references should not be construed as an admission that these structures, systems, and/or methods constitute prior art. The inventor expressly reserves the right to demonstrate that such structures, systems, and/or methods do not qualify as prior art.

In the background art, certain systems have been designed for dynamic advertising for the Internet and interactive games. For example, U.S. Patent Publication No. 2006/0105841 is directed to a dynamic advertising system for interactive games and describes an apparatus for adding and displaying objects within an interactive game program that can be updated interactively while the game is being played. The system can track the actual exposure of the advertisement. U.S. Pat. No. 8,160,925 is directed to a system for generating a smart advertisement based on a dynamic file and a configuration file, and is capable of generating advertisement based on targeting information, user interests, and deals, and can improve the displayed adds.

Moreover, U.S. Pat. No. 8,000,581 is directed to an advertisement scheme that can be used with interactive content, and allows suspending the playing of the interactive content, to display an advertisement, and resuming the playing of the interactive content. U.S. Pat. No. 7,698,178 is directed to an online game advertising system, in which advertisements are displayed within a billboard that appears within a game playing space of the game program. The system allows the interacting with a user to provide additional information about a product being advertised.

However, when large amounts of resources are directed towards advertising in a virtual environment, for example virtual living spaces such as SecondLife®, SimCity®, strategy games such as Colonization®, Civilization®, first-person shooter games Call of Duty®, Grand Theft Auto®, simulation environments such as Flight Simulator®, X-Plane®, Gran Turismo®, etc., analysis of the effectiveness towards a user or a user group of the advertising that appears in the virtual environment can be desirable. Also, analysis of advertising effectiveness can be difficult due to the cost involved in conducting the analysis, the time involved in collecting and analyzing data, and the difficult decisions that have to be made regarding what data to collect, when to collect the data, and where to collect the data. Thus, there is a need in the art for a system and a method of analyzing advertising effectiveness in accordance with the present invention.

SUMMARY

Accordingly, an exemplary device that analyzes advertising effectiveness can include an asset repository that stores a plurality of smart objects, an interface that accepts one or more smart objects from the plurality of smart objects, an event stream processor that receives information from the one or more smart objects and provides metrics based on the information from the one or more smart objects to determine advertising effectiveness, and a bind engine that receives information from the one or more smart and finds correlations between user behavior towards the one or more smart objects user traits, and identifies relationships to determine the advertising effectiveness.

An exemplary method of analyzing advertising effectiveness can include providing one or more smart objects with advertising; inserting the one or more smart objects into an interface; receiving information from the one or more smart objects; analyzing the information for particular predetermined combinations of user interactions, actions subsequent to the user interactions, or user interactions and actions subsequent to the user interactions; and if any particular predetermined combinations of user interactions, actions subsequent to the user interactions, or user interactions and actions subsequent to the user interactions are found, providing metrics or analytics based on the found predetermined combinations of user interactions, actions subsequent to the user interactions, or user interactions and actions subsequent to the user interactions, receiving information from at least one of the one or more smart objects, user profile data database, registration data database, and rewards and advertiser databases, analyzing the information for correlations between at least one of particular predetermined combinations of user interactions, actions subsequent to the user interactions, user interactions and actions subsequent to the user interactions, information user profile data database, registration data database, and rewards and advertiser databases, and identifying patterns and relationships based on said correlations and providing metrics or analytics based on said correlations.

Moreover, another exemplary method of changing marketing campaign is provided that can include the steps of selling a product in at least one of a real store or an online store; promoting the product with an advertisement campaign having characteristics; labeling interactive objects of a video game with a brand of the product and with brands of other competing products to generate interactive smart objects; receiving information at a computer system from an interface with the video game on the interactive smart objects; analyzing the information for particular predetermined combinations of user interactions, actions subsequent to the user interactions, or user interactions and actions subsequent to the user interactions of a user of the video game at the computer system; providing metrics or analytics based on said step of analyzing; receiving information from at least one of the interactive smart objects, user profile data database, registration data database, and rewards and advertiser databases at the computer system; analyzing the information for correlations between at least one of particular predetermined combinations of user interactions, actions subsequent to the user interactions, user interactions and actions subsequent to the user interactions, information user profile data database, registration data database, and rewards and advertiser databases; identifying patterns and relationships based on said correlations and providing metrics or analytics based on said correlations; and changing the characteristics of the advertising campaign based on results of said step of identifying patterns and relationships.

In addition, yet another method of providing product coupons is provided by the present invention. The method can include the steps of labeling an interactive object of a video game with a brand of the product to generate an interactive smart object, receiving information at a computer system from an interface with the video game on the interactive smart object and the user actions with the smart object, analyzing the information for particular predetermined combinations of the user interactions, actions subsequent to the user interactions, or user interactions and actions subsequent to the user interactions of a user of the video game at the computer system, providing metrics or analytics based on said step of analyzing, receiving information from at least one of the interactive smart objects, user profile data database, registration data database, and rewards and advertiser databases at the computer system, analyzing the information for correlations between at least one of particular predetermined combinations of user interactions, actions subsequent to the user interactions, user interactions and actions subsequent to the user interactions, information user profile data database, registration data database, and rewards and advertiser databases, identifying patterns and relationships based on said correlations and providing metrics or analytics based on said correlations, and providing a product coupon related to the brand to the user in a case said step of identifying has determined that the patterns and relationships indicate a high user interest towards the brand.

It is to be understood that both the foregoing general description and the following detailed description are exemplary and explanatory and are intended to provide further explanation of the invention as claimed.

Other objects, advantages and salient features of the invention will become apparent from the following detailed description, which, taken in conjunction with the annexed drawings, discloses an exemplary embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a and 1b show a flowchart illustrating flow of information in a system of analyzing advertising effectiveness in accordance with an exemplary embodiment of the invention;

FIGS. 3a and 3b show a flowchart illustrating game flow of information in the exemplary embodiment shown in FIGS. 1a and 1b;

FIGS. 5a and 5b show a flowchart illustrating developer flow of information in the exemplary embodiment shown in FIGS. 1a and 1b;

DETAILED DESCRIPTION

Figure 10A:
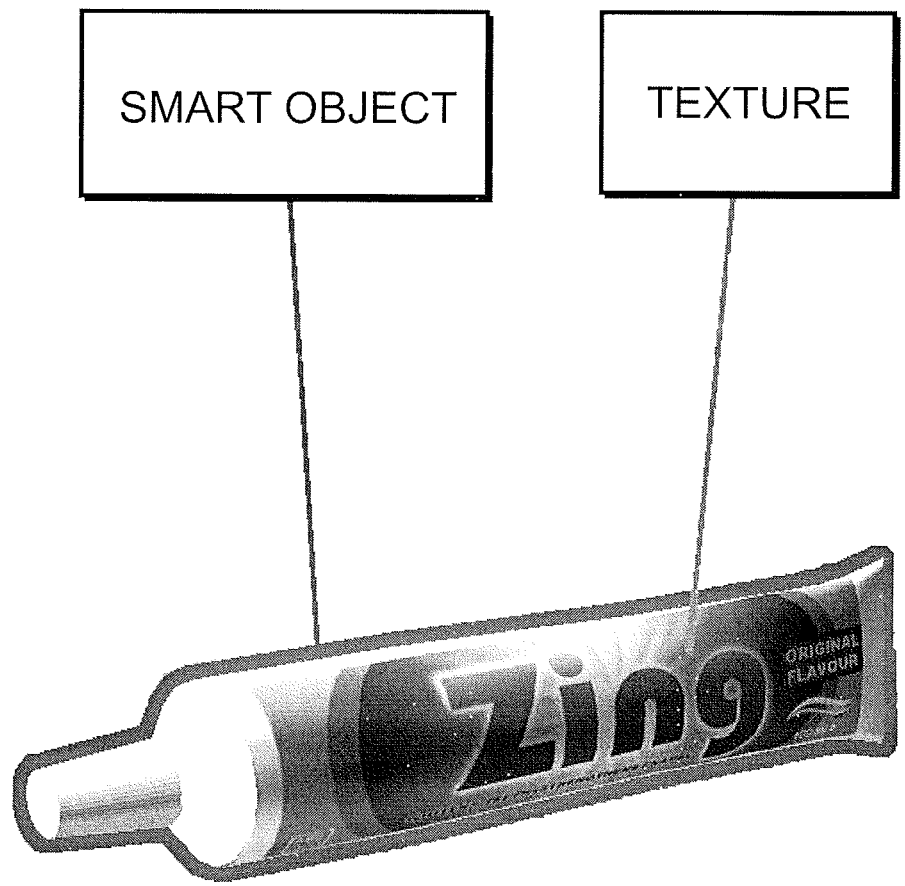
FIGS. 10a to 10c show exemplary representations of smart objects in a virtual space.
Figure 10B:
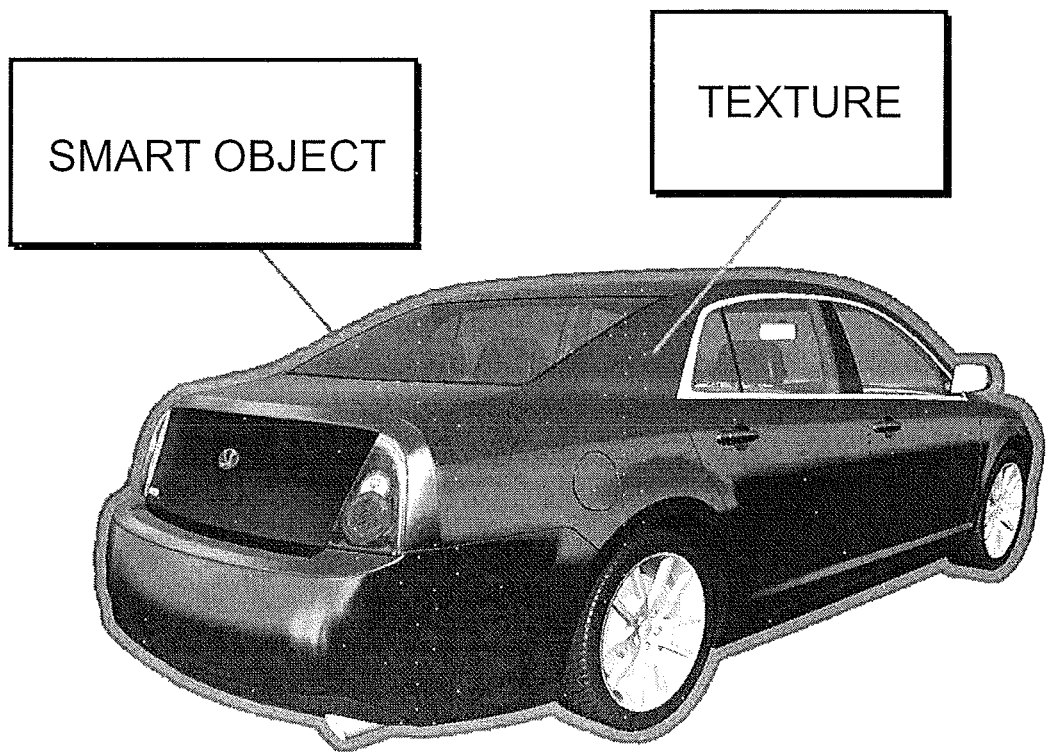
Figure 10C:
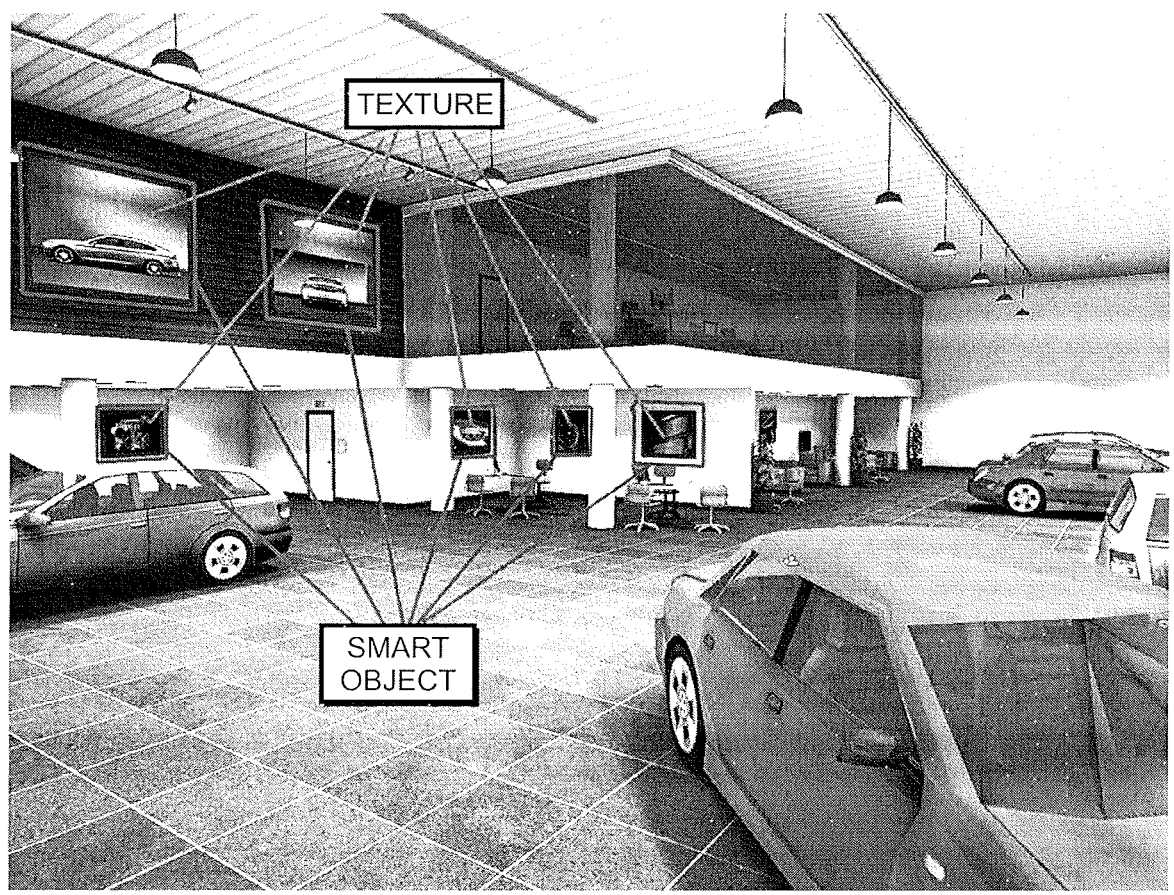

Referring to the figures, a system 10 is adapted to analyze advertising effectiveness. The system 10 can have an interface, such as an entertainment interface 23 in which a user can be presented with one or more smart objects in a digital environment. The smart objects can include or take the form of non-branded item, advertisements, branded products, or other forms of advertisements in the digital environment for example by the use of virtual three-dimensional rendered digital objects that are branded in a virtual space. Examplary screenshots of smart objects are shown with respect to FIGS. 10a to 10c. When the user interacts with the one or more smart objects, at least one of the smart objects can record the interaction and transmit data about the interaction to the system 10. The system 10 can then analyze the user interaction with the smart object to provide a measurement of advertising effectiveness. Also, the system 10 can analyze user interaction to generate demographical data on user interaction with objects, by taking into account user attributes such as age, gender, taxonomy classification from a third party network API 20.

Figure 1A:
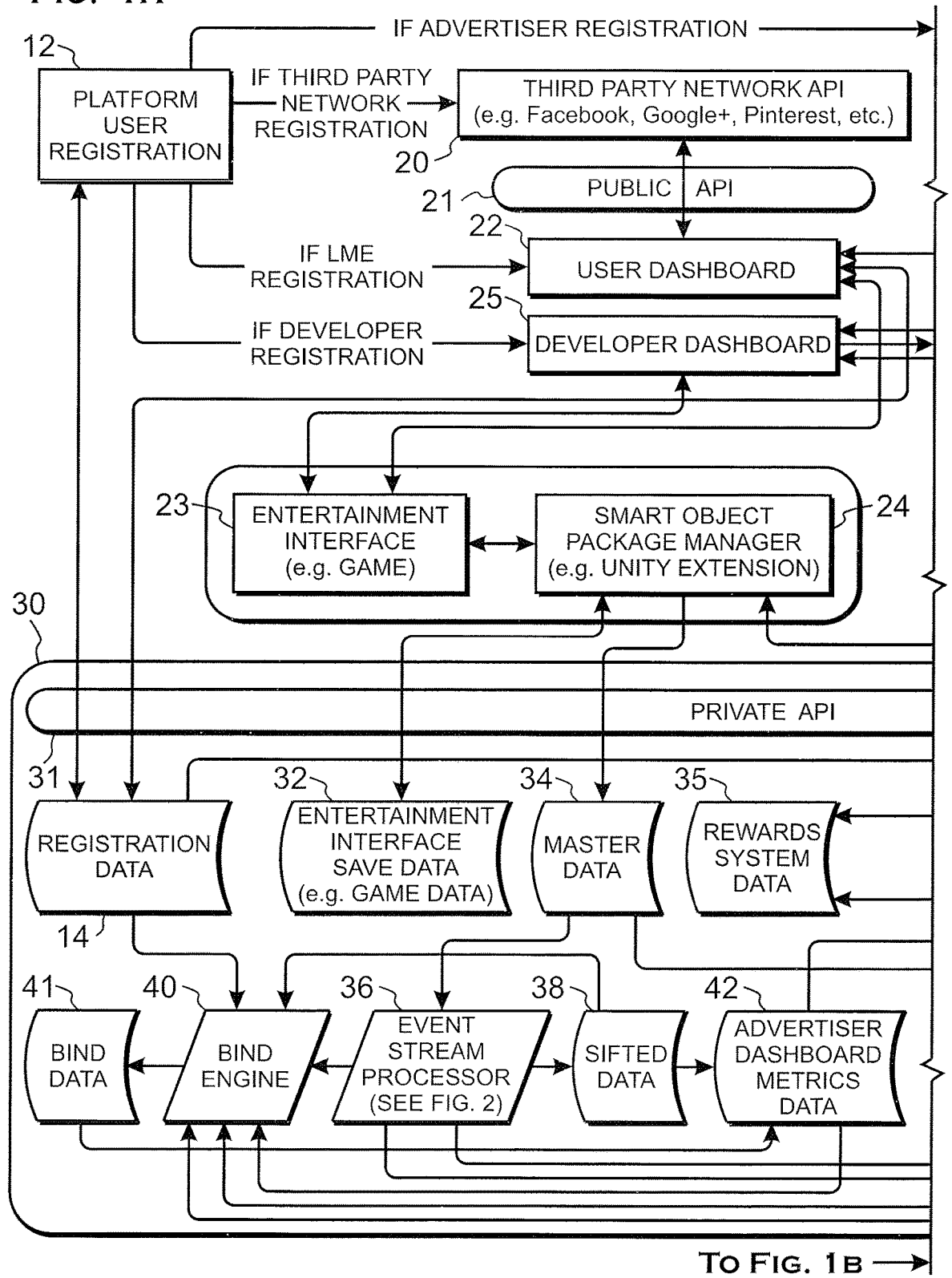

Referring to FIGS. 1a and 1b, the exemplary system 10 can include the entertainment interface 23, a smart object package manager 24, and an event stream processor 36. As will be described in greater detail below, the entertainment interface 23 can provide an opportunity for electronic interaction, such as electronic interactions within a virtual environment like a video game. In the description that follows, the exemplary system 10 is described as including an entertainment interface 23 that comprises an electronic game for the sake of simplifying the description of the invention and clearly describing the invention. However, the invention is not meant to be limited to only electronic games. In other constructions, the entertainment interface 23 can comprise an electronic simulation, virtual three-dimensional environment, streaming video provider, or some other form of electronic interaction.

The smart object package manager 24 can provide one or more smart objects in the electronic interaction. The one or more smart objects can be presented to the user in the form of a non-branded item, an advertisement, a particular branded item, a video clip, an audio clip, some combination of the aforementioned, or some other form that is related to determining the effectiveness of advertising. Some examples are given in FIGS. 10a-10c. For example, the entertainment interface 23 can provide a video game in which several smart objects can appear as a soda can of a particular brand, a particular model of a car, a billboard advertisement, a music video clip, or some other object that can be related to advertising. However, the smart objects and system 10 may not necessarily be limited to the use with advertising, but can be associated with a virtual environment having specific characteristics and traits that may cause a user to engage in behavioral patterns that can be analyzed, for example in a virtual training software for the training on the operation of certain real-world devices that need to be handled in a special way that corresponds to an ideal behavioral pattern or operational sequence in the real world. As an example, virtual training software can include, but are not limited to simulation software environments that can simulate rescue missions such as avalanche and earthquake rescue, the handling dangerous objects such as toxic waste and its management, the manipulation of weapons, the disarming of mines and other explosive devices, the operation and controlling of chemical processes in laboratories or manufacturing plants, the operation of complex machinery, the operation of a nuclear power plant, and the operation of complex and expensive systems. Items that appear and can be operated by the user in the virtual setting will thereby be associated to smart objects. The appearance, behavior, placement, use, and other similar aspects of each of the smart objects can be modified by the asset switch system or entertainment interface save data database 32 via a manager object 24.4.

At least one of the smart objects can record different types of user interaction with one or more of the smart objects and can transmit the interaction to the event stream processor 36. The event stream processor 36 can then analyze the user interaction with the one or more smart objects to determine the effectiveness of advertising. For example, a particular user interaction combined with a particular subsequent user action can be a metric for effectiveness of advertising. For example, smart objects preferably appear as virtual products and objects in a virtual environment and can be associated with advertising of a particular brand, and thereby the advertising will appear in the virtual environment to a user when the smart objects are perceptible by the user on the screen. The virtual products and objects can be manipulable with within the virtual environment by a user, for example a virtual "picking up" or by selecting, using, etc. The user is a real person operating an avatar or a virtual device representing the user or operated by the user in the virtual environment, but the user as a real person will be able to see the smart objects on a screen of the computer system once they appear in the field of view of the virtual environment that appears on a computer screen. The advertising of the virtual products and objects can appear in many ways, for example as audio, a 2D or 3D labels, logos, printed surfaces, engravings, video, 3D shaped icons, packaging labeling of a product, etc.

For example, when the user is operating an aircraft by a flight simulator software, it is possible that the user has to pass by a virtual store for refueling the aircraft with fuel and oil, and will have the choice of different branded oils and fuels. As an interaction, the user may inspect an oil can and its label, and as a subsequent action, the user may choose a particular brand for use for his aircraft by a purchase, or by passing the oil can to aircraft maintenance personnel. Similarly, in a car racing game such as Gran Turismo®, the user may first configure his car with different types of real-world engine brands, such as Ferrari®, Porsche®, Toyota®, different types of suspension sets such as Bilstein®, Monroe®, ZF-Sachs®, Koni®, etc. as a first interaction with the smart object at a configuration page representing a car shop. Once the car is configured, the user may share comments to other racers in the game on this enthusiasm, indifference, or criticism on the product choice, or may go back to the car shop, as a subsequent action. It is possible that the game is connected to a social media network such as Facebook®, Twitter®, Google+®, MySpace®, Friendster®, or a network that is proprietary to the game, or the console the game is running on.

Within a military domain, a user may interact with improvised explosive devices (IED) in a virtual environment as a simulated training exercise. A user's goal may be to detect and disarm an IED similar to how a soldier would in a real-life situation. In the simulation, a user may detect or identify an object as an IED and interact with the object by accessing a virtual tool belt with available items and approaches, and select the one he thinks will disarm the IED. Thereby, the IED and the items of the tool belt are graphical representations of smart objects. These series of interactions may be assessed and aid in the training of soldiers in IED training exercises. Furthermore, interactions with object within different virtual environment simulated training exercises may influence object attributes in future exercises thereby increasing the task complexity, difficulty, environment location, etc.

As a further example, the smart object can appear as a soda can in a virtual environment of a particular brand for example in a first-person shooter game where the user has to replenish his energy levels, the user may interact with the soda can for a certain period of time, such as by holding and inspecting the soda can, and then the user may take a certain subsequent action with the soda can, such as sharing the brand of the soda can through a social network. In another example, in an investigation game a user interacts with a soda can and dusts it for fingerprints. The user may take a subsequent action with the soda can through a social network such as inviting a friend to help process the fingerprints at a virtual forensic laboratory. The friend's laboratory results may then be transmitted to the user through a social network.

In yet another example, it is possible that the user of a virtual world enters a grocery store for shopping and chooses the products based on the brands, just like in a real store. The user's interaction with the object could be the picking up of the object to put it in the cart, and the subsequent action could be the purchasing of the object at the virtual cash desk, and the subsequent use of the object in the virtual world. The user's interaction and subsequent action can be transmitted by the smart object that appears as the soda can. The event stream processor 36 can then determine that the transmitted combination of user interaction and subsequent user action is a metric. For example, the combination of the holding and sharing the soda can may be determined to be a metric associated with consideration in an advertising return on objective funnel. Thereafter, several metrics can be combined to form analytics data that can be presented to advertisers, or other domains.

In another example, it possible that the user of a virtual world sports game may be given the option to be sponsored by a specific brand. The user's choice of brand can be followed up with a subsequent custom action specific to the game such as broadcasting the sponsorship choice through a social network. The action may be broadcast as a user "just got Nike to sponsor his basketball team." In another example where a user is playing a strategy investigation game, the user may be required to use an HP® computer tablet to view a laboratory test results report of the analysis on an evidence item. The user may interact with the computer tablet by picking up, bringing closer to view, touching the screen with his finger and sending the report results to a friend on a third party network 20 such as a social network. The action of sending the report to a friend may be broadcast to the friend on the social network as the "lab results have arrived and were sent from my HP® tablet."

In another example, a user may enter a carnival virtual environment where he competes in a time-based challenge similar to the "Milk Bottle toss" game. The environment could be populated with Pepsi brand bottles where the user must try to toss as many rings around the bottles as possible with the provided rings. The results could be published to the user's third party network, such as a social network, indicating that he "landed 3 out of 5 rings around the Pepsi bottles in the toss game." In yet another example, a user may be playing a game that requires him to observe a photograph and recreate the photograph by using a Canon Digital SLR® camera in the virtual environment. The user would need to navigate through the environment and find the location where the picture was taken. Similar to a real life Canon Digital SLR® camera, it is possible to use a variety of camera lenses to achieve a different depth of field. A user may be required to use a certain lens to match the photograph's depth of field appearance. By testing the various camera lenses on the virtual camera, the user would become informed about the camera and lens capabilities, thereby translating Canon® brand recognition to a metric.

The system 10 can include a platform registration 12. The platform registration 12 can be an interface for performing profile registration. The system 10 can have several different types of users, such as the user of the entertainment interface 23, a user that is an advertiser or related to an advertiser, a user that is a developer of an interface for the entertainment interface 23, or some other user. Thus, the platform registration 12 can be in communication with registration data database 14, an advertiser dashboard 16, and a user dashboard 22. For the user of the entertainment interface 23, the profile registration can be facilitated by a third party. For example, a third party network member may be able to login with their third party network identity, for example a social network member may be able to login into the system 10 with a social network identity. Thus, the platform registration 12 can be in communication with a third party network application programming interface (API) 20, for example a social network API. The social media API can connect, but is not limited to Facebook®, Twitter®, Google+®, MySpace®, Friendster®, or can connect to a user network that is proprietary to a gaming console, such as Sony PlayStation®, Nintendo Wii®, Microsoft XBOX®, etc. or to a network that is part of the user group that has signed up for the game as a registered user. In the construction shown in the figures, profile registrations of advertiser users and developer users is not facilitated by any third party.

The registration data database 14 can be in communication with the platform registration 12, the user dashboard 22, developer profile data database 45, the blend-interpret-decide (BIND) engine 45, or both. The registration data database 14 can store unique user identifiable data received from the platform registration 12. The unique user identifiable data can be real world user data and can include, but is not limited to, name, email address, physical address, gender, age, location, other identifiable data, for example data that allows to classify the user into a consumer group, or some combination of the aforementioned. For example, it is possible the user has identified himself as a hobbyist, car or motorbike enthusiast, sports lover associated with certain sports or geographic locations, music lover associated with certain genres, video game enthusiast, movies enthusiast, etc. The unique user identifiable data can be supplemented with additional data at a later time. In a construction wherein the system 10 communicates with a third party network API 20, the unique user identifiable data can include data from a third party network, that may initially include, but is not limited to, name, email address, physical address, gender, age, location, other identifiable data, or some combination of the aforementioned. In such a construction, the initial unique user identifiable data can be supplemented with additional data with the user's consent. In the system 10 shown in the figures, the registration data database 14 can be a database.

The advertiser dashboard 16 can provide an interface that presents analytics data. The advertiser dashboard 16 can be in communication with an advertiser dashboard metrics data database 42. The advertiser dashboard 16 can provide an administrative console that allows management and defining of a specific product, product line, brand, or marketing campaign associated with smart objects. The advertiser dashboard 16 can also be in communication with an advertiser dashboard save data database 48 that can store parameters for managing and defining the specific product, product line, brand, or marketing campaign associated with smart objects.

For example, a time-based marketing campaign may set a numeric value parameter associated with the asset switch system 46 indicating the duration of a campaign. Another parameter may define the appearance of a smart object associated with a graphic texture asset retrieved from the asset repository 50. Yet another parameter may define a promotion associated with a campaign. A promotion may be a reward presented to a user when a defined qualified marketing metric has been satisfied. Another parameter may define the monetary budget associated with a campaign. When the duration of a campaign has expired or the monetary budget has been reached by satisfying a qualified marketing metric, a parameter may be modified whereby initiating a change to the smart object appearance associated with a graphic texture asset retrieved from the asset repository 50. Also, the advertiser dashboard 16 can be in communication with a developer profile data database 45. The developer profile data database 45 can include game developer categories that may be used as a basis for defining marketing campaign criteria. Categories may include, but not limited to type of game such as role playing game, first-person shooter, massively multiplayer online, genre such as action, action-adventure, sports, strategy, casual, age and content ratings such as adults, mature, early childhood, and teen.

The advertising dashboard 16 can also be an interface for uploading user defined assets that can be associated with smart objects. Thus, the advertising dashboard 16 can be in communication with an asset repository 50 that can store assets that can be associated with smart objects such as, but not limited to, a graphic texture, audio, and video.

The advertising dashboard 16 can also be in communication with a rewards system 33. The advertiser user can thus manage a reward campaign through the advertising dashboard 16. For example, the advertiser user can create and manage a reward campaign for users based on a predetermined, defined, qualified marketing metric. The reward campaign details may be defined in real time. For example, the details of the reward campaign may include advertising dollars, product type, duration, target demographic, and other related campaign details. In another example, the products and advertising dollars may be shifted between games on the system 10.

The system 10 can be in communication with the third party network API 20. In the embodiment shown in the figures, the platform registration 12 is in communication with the third party network API 20. A social network can be an online service, platform, or site that can integrate with the system 10. The social network can identify user data, such as, but not limited to, name, gender, age, location, and other user data. The social network can allow access to a social interaction, such as, but not limited to, "like" on Facebook, photos, send gift, friend request, some other system or method of social interaction, or some combination of the aforementioned. Thus, the social network can increase the engagement with the system 10. Moreover, system 10 can also be in communication with the third party network API 20 through a public application programming interface 21 or public API 21. In the embodiment shown in the figures, the user dashboard 22 can be in communication with the third party network API 20 through the public API 21. The public API 21 can be a publicly available interface for sharing data between the system 10 and the social network.

The user dashboard 22 can be in communication with the platform user registration 12, the public API 21, the entertainment interface 23, the registration data database 14, and a rewards system data database 35. The user dashboard 22 can be an interface that allows management of user's related content, for example, but not limited to leaderboards, rankings, virtual goods, and classifications. The user dashboard 22 can also include a list of entertainment interfaces, such as games associated with the user, social networks associated with the user, social network communications associated with the user, and rewards associated with the user. The social network communications can include invitations to friends to play a game. The rewards can include coupons. The user dashboard 22 can be an interface that allows the user to access the rewards system 33 to manage rewards.

The entertainment interface 23 can be an interface, a platform, or a combination of an interface and a platform. The entertainment interface 23 can be in communication with a smart object package manager 24, the user dashboard 22, and a developer dashboard 25. The entertainment interface 23 can be used by a user to input interactions, relevant data identification, or some other information. In alternate constructions of the system 10, the entertainment interface 23 can comprise a video game engine, an over-the-top service provider such as a streaming video provider, a cable provider interface, or some other type of electronic interaction. The entertainment interface 23 can be in communication with the third party network API 20. Thus, the entertainment interface 23 can be a portal to the social network.

The smart object package manager 24 is configured to be in communication with the entertainment interface 24, a master data database 34, and the asset switch system 46. The smart object package manager 24 can be a unit or a system that includes a collection of objects. The objects can include an editor manager object 24.1, an asset controller object 24.2, a smart object 24.3, and a manager object 24.4. The objects can receive, transmit, or receive and transmit directed actions to the system 10.

The editor manager object 24.1 can be an object that, at edit time, can facilitate the placement of the smart object 24.3 inside the development environment editor. The editor manager object 24.1 can retrieve wireframe assets from the asset repository 50. At runtime initialization or game play, the editor manager object 24.1 retrieves the asset controller object 24.2 and the manager object 24.4.

The asset controller object 24.2 can be an object that, at runtime initialization, can retrieve assets from the asset repository 50 via the asset switch system 46. The asset controller object 24.2 can initialize the retrieved assets with attributes. The attributes can include, but is not limited to, positioning coordinates, texture, audio, video, supplemental scripts, or other attributes. After initialization, the asset controller object 24.2 can destroy itself and the editor manager object 24.1, thus leaving only the manager object 24.4. Assets from the asset repository 50 may be user defined via the advertiser dashboard 16 or as an influenced response to a call to action of a smart object 24.3. An advertiser user can specify via the advertiser dashboard 16 an alternate asset to be used on a smart object 24.3. The alternate asset can be another texture. For an influenced response to a call to action of a smart object 24.3, within a game, for example, a user can interact with a computer of a particular brand and share the computer brand with a friend via a third party network, for example social network. Then, the asset controller object 24.2 within the friend's game, at runtime initialization, can retrieve an asset from the asset repository 50 influenced by the computer brand, such as a video advertisement. In another example, a user's interests on a third party network, for example social network, may also influence a smart object's 24.3 attributes if the system recognizes that a user's social network interest is Coca-Cola®. The texture of a smart object 24.3 in the form of a soda can may change as a result of the data, or combination of data.

The smart object 24.3 can be an object that includes unique code capable of communicating with another smart object 24.3. The smart object 24.3 can also communicate with the manager object 24.4, for example by sending and receiving data such as attributes. The smart object 24.3 can be an audio object, a video object, a three-dimensional (3D) object, a two dimensional object (2D) object, or some other object. The smart object 24.3 can monitor event data that is related to the object. For example, the smart object 24.3 can monitor events, such as but not limited to, click object, pick up object, view object up close, time spent with the object, perform call to action on object As an example, share via social network or bookmark an object within a game, developer defined events, and others.

The manager object 24.4 can be an object that, at runtime, can facilitate the receiving and transmitting of one or more smart objects 24.3 data to the system 10. The manager object 24.4 can dynamically update one or more attributes of a smart object 24.3. For example, the manager object 24.4 can change an object type, texture, audio, video, positioning, or some other attribute of the smart object 24.3.

The developer dashboard 25 can be in communication with the platform user registration 12, the developer dashboard data 45, the developer dashboard metrics data database 44, and the entertainment interface 23. The developer dashboard 25 can be an interface for submitting games or some other electronic interaction to the system 10. In one or more constructions of the system 10, the developer dashboard 25 can be an administrative console that can manage and define a game's category. The game categories can include type of game, genre, rating, target audience, screen shot, and others. In one or more constructions of the system 10, the developer dashboard 25 can be an interface whereby developer's game analytics data from a developer dashboard metrics data database 44 is represented. In one or more constructions of the system 10, the developer dashboard 25 can be an interface whereby revenue generated from the developers' games is represented.

A domain specific language 30 can be a unique programming language designed for communication within the system 10 and across multiple collections of data, such as smart objects data, filtered data, user registration data, and other data for uniform access to, the resources of system 10. In the embodiment shown in the figures, the domain specific language 30 can include programming language for communication between a private application programming interface 31, the registration data database 14, the entertainment interface save data database 32, the master data database 34, the rewards system data database 35, the rewards system 33, the BIND engine 40, the advertiser dashboard metrics data database 42, the developer dashboard data database 45, the asset switch system 46, the event stream processor 36, the sifted data database 38, the developer dashboard metrics data database 44, the monetization system 47, and the advertiser dashboard save data database 48.

An advertiser metric can be defined as a measurement of one or more qualified marketing metrics. A qualified marketing metric can be comprised one or more user interactions with smart objects and subsequent actions. A qualified marketing metric may be combined with other defined qualified marketing metrics resulting in a unique qualified marketing metric. An advertiser metric can be used to identify an advertiser's intended reach or objective to a target audience. For example, in a traditional marketing ecosystem, a qualified marketing metric, for example an advertiser's objective of a marketing campaign can be identified as consideration. This objective can be satisfied if a user interacts with multiple brands soda cans, and then makes a choice of a preferred brand by picking up the soda can and sharing the product brand with a friend on a third party network such as social network. A developer metric can be defined as a measurement of one or more qualified marketing metrics. A qualified marketing metric can include one or more user interactions with smart objects and subsequent actions, whereby the qualified marketing metric can be identified as an objective that can be used to aid in the monitoring of interactions with one or more smart objects for the purpose of improving game design. For example, a game may require a user to locate a key before opening a door, while the key and door are smart objects. Interactions with these smart objects can determine that the objective was not met and users end the game because they are spending too much time searching and have difficulty locating the key due to it's location.

The private application programming interface 31 or private API 31 can be a private interface for sharing data between the entertainment interface 23 and the system 10. In the embodiment shown in FIGS. 1, 3, 5, 7, and 9, the private API 31 can be the private interface between the smart object package manager 24 and the registration data database 14, the entertainment interface save data database 32, the master data database 34, the rewards system data database 35, the rewards system 33, BIND engine 40, the developer dashboard data database 45, the asset switch system 46, the event stream processor 36, the sifted data database 38, the developer dashboard metrics data database 44, the monetization system 47, and the advertiser dashboard save data database 48.

The BIND engine 40 is configured to perform different tasks that include (a) the blending of data that is a combination of data from the master data database 34 and the registration data database 14, and sifted data database 38 and the registration data database 14, (b) to make queries to the rewards system 33 to determine if a promotional campaign reward has been presented, and to (c) make queries to the asset switch system 46 for accessing an advertiser defined counter value that can be compared against a qualified user interaction than can be received from the event stream processor 36, or a qualified marketing metric that can be accessed from the advertiser dashboard metric data database 42, so that the BIND engine 40 can determine if a marketing campaign has been completed. A qualified user interaction or qualified marketing metric could, in turn, trigger a relevant reward to a user based on a user's traits via the rewards system 33 if the marketing campaign has not been completed.

The BIND engine 40 may initiate an attribute change to a smart object based on a user's series of actions. A series of events or call to action with a branded smart object may indicate that a user has expressed affinity to the brand and subsequently change the appearance of a different smart object to a complimentary brand. For example, a user sees an Oral-B® dental floss smart object and inspects the item and its label bringing the field of view closer in the virtual environment. As a subsequent action, the user may choose the share the particular branded product with other users through a social network, thereby promoting the brand. The BIND engine 40 can instruct another smart object to take the appearance of a tube of Crest® toothpaste, a complimentary Procter & Gamble® brand.

BIND engine 40 may also initiate an attribute change to a smart object 24.3 based on a user's third party network traits prior to interacting with any smart objects 24.3. For example, a user on Facebook® may log in to the system 10 with their social network identity to play a game. The user's social network profile may indicate that he likes Country music, therefore when the user logs in to the system 10 to play a game, a smart object 24.3 may take the appearance of a TV showing a video of a featured Country music artist or song heard when walking into a virtual coffee shop. In another example, a user on Facebook® may log in to the system with their social network identity to play a game. The user's social network profile may indicate that he is 20 years old, lives in New York and likes horror movies. Therefore when a user logs in to the system to play a game, a smart object 24.3 may take the appearance of a movie poster of an upcoming R-rated horror movie.

BIND engine 40 may automatically initiate smart object marketing optimization processes based on interactive conditions within the user interface environment in order to preserve and/or improve the advertisers marketing objective results. For example, an advertiser marketing objective of "selection" could be monitored by the BIND engine 40 via the event stream processor 36. If user interactions are not meeting the "selection" quota, a smart object 23.4 in-game location attribute may be determined inadequate and subsequently the BIND engine 40 may initiate an attribute change such as the location of a branded smart object within the entertainment interface to a location that has a higher historical probability of user "selection." Additionally, the BIND engine 40 may determine that a location of a different (generic) smart object has a higher concentration of user "selection" and therefore swap this generic smart object with the branded smart object or similar attribute.

In another example, demographic properties can be used as basis for the optimization process to achieve a marketing objective within a specific game or games. With a target marketing objective of "Awareness" among males ages 21-36, at the initialization of each game the BIND engine can determine a location within each selected game that has a highest concentration of active "Awareness" measurement in the target demographic (males ages 21-36) and automatically place the branded smart object into that location. The automatic relocation by optimization of branded smart object through the life cycle of an ad campaign can help the advertiser to meet their marketing objective.

A qualified user interaction can be defined as an event or interaction with one or more smart objects identified by an advertiser as a part of a reward campaign. For example, an advertiser may define, through the advertising dashboard 16, a bookmark event as a qualified user interaction in a reward campaign. In a game, a user can pick up a brand's soda can and choose to bookmark the brand for viewing at a later time. When the bookmark interaction occurs, the BIND engine 40 can be notified and can compare an advertiser defined counter value against a bookmark qualified user interaction to determine if a marketing campaign is open and present a relevant reward to the user based on a user's traits. In another example, an advertiser may define consideration as a qualified marketing metric in a reward campaign. In a game, a user can interact with multiple brands soda cans, and then make a choice of a preferred brand by picking up the soda can and sharing the product brand with a friend on a third party network such as social network. When all interactions have been completed followed by the share interaction, the BIND engine 40 can be notified and can compare an advertiser defined counter value against a consideration qualified marketing metric that can be accessed from the advertiser dashboard metric data database 42 to determine if a marketing campaign is open and present a relevant reward to a user based on a user's traits.

The blended results of (a), (b), and (c) can be algorithmically interpreted and a decision parameter can be generated based on an algorithm that can be transmitted as a signal to the asset switch system 46 to initiate a change to any of the attributes of the smart objects 24.3. Moreover, BIND engine 40 is configured to blend accounts with user's traits that include user profile data entries of user dashboard 22, registration data from the registration data database 14, data from the third party network API 20, activities with the entertainment interface 23, activity with the smart objects 24.3, rewards and advertiser campaigns. Thereby BIND engine 40 can employ a neural network or fuzzy logic to find correlations between user behavior towards the virtual product and user traits, and identify patterns and relationships. For example, a pattern or series of events with a smart object may define a consideration metric. A user sees a smart object soda can and inspects the item and its label bringing the field of view closer in the virtual environment. As a subsequent action, the user may choose the share the particular branded product with other users through a social network, thereby promoting the brand.

Furthermore if the user has displayed multiple instances of similar behavior such as sharing a product brand with other users, a pattern may emerge indicating that the user has a high affinity of promoting a brand. A relationship may be formed between users and advertisers by interacting with smart objects. For example, a user forms a relationship with Coca-Cola® if the user interacts with the brand's soda can by picking it up to view up close and share the brand with a friend via a social network. Because the user initiated a subsequent action with the brand that included a friend, a relationship can be formed between the brand and the friend, and also the user, brand, and friend.

The BIND data database 41 can be in communication with the BIND engine 40. The BIND data database 41 can store the patterns and relationships data identified by the BIND engine 40.

The advertiser dashboard metrics data database 42 is configured to make data available to the advertiser dashboard 16 for the purpose of analytics reporting. The database 42 may include qualified marketing metric for identifying the multiple stages within a marketing life cycle. The stages are used as a basis for defining a specific product, product line, or brand marketing campaign. The developer dashboard metrics data database 44 includes data that is made available to the developer dashboard 25 for the purpose of analytics reporting. This data includes performance data on smart objects 24.3 that allows a developer to monitor object inclusion in the entertainment interface 23 and participation in advertiser marketing campaigns.

The entertainment interface save data database 32 can be in communication with the smart object package manager 24. The entertainment interface save data database 32 can store information about a state of the user within the entertainment interface 32. For example, if the entertainment interface 23 includes a video game, the entertainment interface save data database 32 can store video game data that may include save game information, current level, points, virtual currency, and other data related to the video game and the user's performance and gaming history. The entertainment interface save data database 32 can also store data for one or more smart objects 24.3 used during game initialization, such as the number of smart objects 24.3 in a game, coordinates, and other data related to the smart objects 24.3.

The rewards system 33 can be in communication with the user dashboard 22, the advertiser dashboard 16, the rewards system data database 35, and the BIND engine 40. Advertiser users can create and manage promotional campaign rewards for users based on a predetermined, defined, qualified user interaction or qualified marketing metric. The rewards system 33 can be in communication with the BIND engine 40 that can receive data from a smart object 24.3 for the predetermined, defined qualified user interactions or query the advertiser dashboard metric data database 42 for the predetermined, defined, qualified marketing metric and can present the reward to the user dashboard 22. For example, the advertiser user can offer discount coupons as a reward to a user if the metric associated with consideration in an advertising return on objective funnel has been satisfied. As an alternative, the advertiser user can define special promotions that are related to the virtual environment the user was using, for example, the user could be rewarded with additional gaming credit for the game, products of the company could be mailed to the user that are cross-branded with the company and product logo, but also with the name of the virtual environment, etc. In another example, the user could be rewarded with a digital music download coupon code for interacting with a company branded virtual environment. For instance, a user may walk into a Starbucks® coffee shop, select their favorite beverage and share it with a friend on a social network. As a result, they user may be rewarded with a digital music download coupon code of a Starbucks featured artist. The rewards system 33 can also interface to the user dashboard 22 where users can view and redeem available promotional campaign offers.

The rewards system data 35 can be in communication with the rewards system 33 and with the user dashboard 22 and the advertiser dashboard 16 through the rewards system 33. The rewards system data 35 can receive data from the user dashboard 22 or advertiser dashboard 16 through the rewards system 33.

The master data database 34 can be in communication with the smart object package manager 24, the event stream processor 36, and the developer dashboard metrics data 44. The master data database 34 can receive data from one or more smart objects 24.3 within the entertainment interface 23, third party network API 20, asset repository 50, and registration data database 14. The master data database 34 can store smart object events received from the smart object package manager 24, such as game identification, player identification, object identification, visibility time or the time an object is viewable on a screen, interaction time, interaction type, time count from first appearance of object until user interaction with object, and other data related to the smart object 24.3. The interaction time can be, for example, the time spent viewing the smart object 24.3. The interaction type can be, for example, click, closer camera view, throwing an object, an event that precedes a call to action such as a social network interaction. Also, the master data database can have entries or references to third party network API 20, asset repository 50, and registration data database 14.

The event stream processor 36 is configured to be in communication with the master data database 34 the sifted data database 38, BIND engine 40, asset switch system 46, and monetization system 47. The event stream processor 36 can accept parameters and can identify one or more events within the entertainment interface 23. The event stream processor 36 can send the identified one or more events to the sifted data database 38. The one or more events to be identified can be updated by creating new definitions for the one or more events to be identified. Thus, new data can be formed from the master data database 34 to be transmitted to the sifted data database 38 as new qualified metrics. The new metrics can be, but is not limited to, awareness, knowledge, consideration, selection, some other portion of an advertising return on objective funnel or other domain such as but not limited to educational, military, medical, and others.

For example, the metrics can be an algorithm that analyzes a duration of pick-up of the virtual object by the user as a first interaction, and whether within a certain time frame the user had other alternative products available that are functional equivalents, but from different brands. Also, the subsequent action can be analyzed, by storing the timing value it takes until the user actually uses the virtual object for a certain purpose. Such timing values are stored for many different users in the advertiser dashboard metrics data database 43, for example from different uses of the virtual environment. The event stream processor 36 is configured to execute metrics algorithm that can analyze the stored timing to see if this user reached qualified metric, or objective, such as consideration in using the product in a time frame followed by a subsequent action.

The event stream processor 38 can also send the identified one or more events to the BIND engine 40. The one or more events to be identified can be updated by creating new definitions for the one or more events to be identified. The, new data can be formed from the master data database 34 to be transmitted to the BIND engine 40 as new qualified user interactions. The new qualified user interactions can be, but is not limited to click, bring closer in view, drop, share, bookmark, trigger point, and others.

The event stream processor 38 can identify one or more events and send data to the asset switch system 46 to modify a user defined counter. In addition, event stream processor 38 can also identify one or more events and send data to the monetization system 47 to modify an advertiser campaign. For example, the qualified user interaction can be identified by an algorithm that analyzes events initiated by a user interacting with a virtual object such as picking up a coffee cup to view closer, and whether one of the events is a defined qualified user interaction. Events defined as qualified user interactions can send data to an asset switch system defined counter and monetization system 47 indicating that marketing campaign qualification has been met. Similarly, event defined as qualified user interactions can be transmitted to the BIND engine 40 to present a reward to a user if the BIND engine 40 determines if a reward and campaign are available. The event stream processor 36 is configured to execute an algorithm that can analyze the events to see if a user initiated a qualified user interaction.

The event stream processor 36 can include a quantification/decision engine designed to analyze the data from the entertainment interface 23, the third party network API 20, master data database 34, and registration data database 14. Based on this data, the event stream processor 36 is configured to present qualified metric results, which can be defined by an advertiser user, to the advertiser dashboard metrics data database 42. Also, the event stream processor 36 can present definitive events identified as qualified user interactions, for example based on a definition in filtering module 36.4, from master data database 34 to BIND engine 40.

Figure 2:
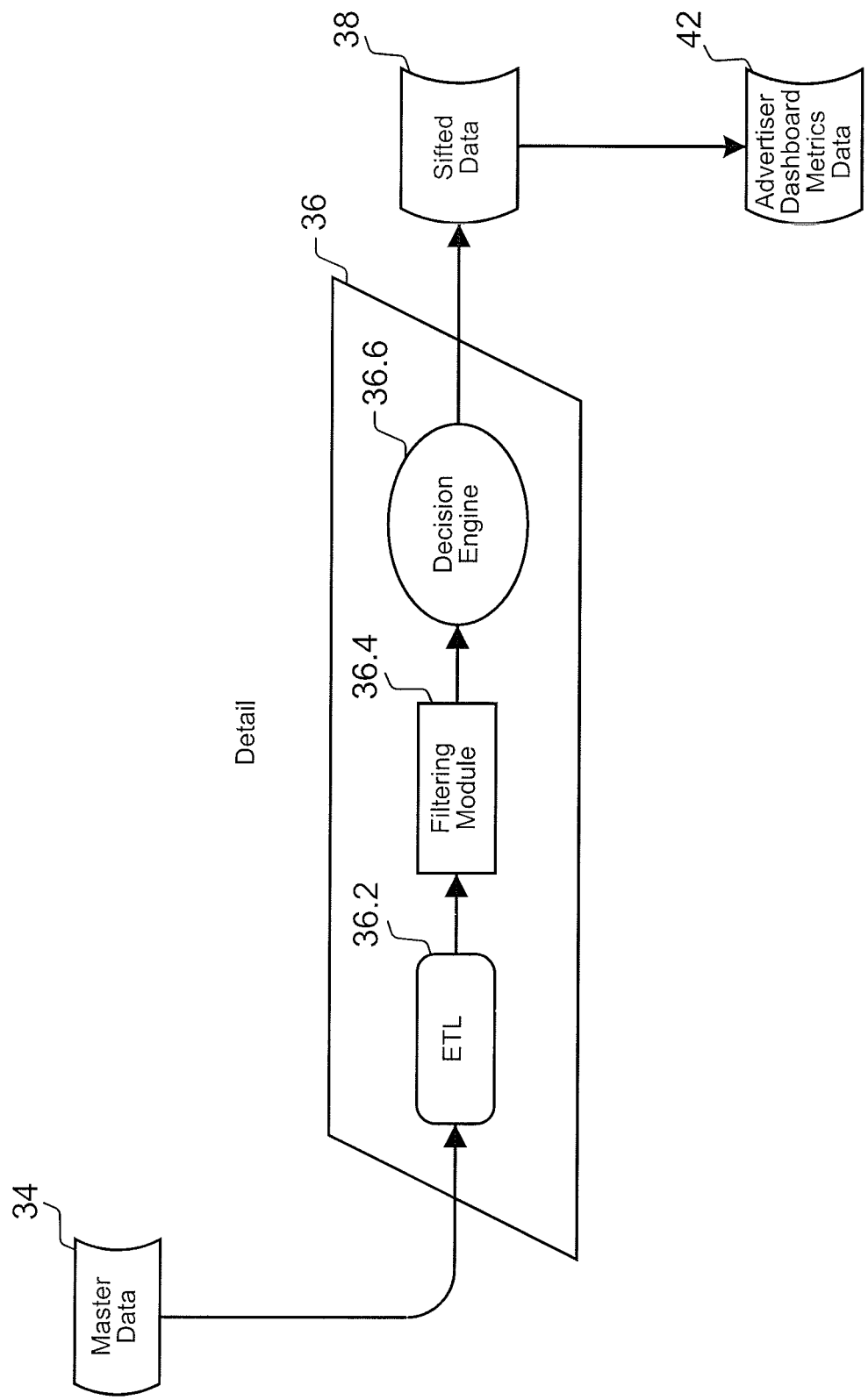
FIG. 2 is a flowchart illustrating flow of event stream processors in the exemplary embodiment shown in FIGS. 1a and 1b.

Referring to FIG. 2, the event stream processor 36 is shown. The event stream processor 36 can include an extract, transform, load element 36.2 or ETL 36.2, a filtering module 36.4, and a decision engine 36.6. The ETL element 36.2 can be in communication with the master data database 34 and the filtering module 36.4. The ETL element 36.2 can receive data from the master data database 34 and extract relevant data. The ETL element 36.2 can transmit the relevant data to the filtering module 36.4.

The filtering module 36.4 can be in communication with the ETL element 36.2 and the decision engine 36.6. The filtering module 36.4 can include definitions of events. The definitions of events can form a list of qualified metrics that can be useful for analyzing advertising effectiveness. For example, a series of events and/or interactions can be defined as a qualified event. In a virtual environment, a user may view a soda can, pick it up to view up close, then share it with a user on a third party network such as a social network. This series of interactions can be a metric. The filtering module 36.4 can transmit the definitions of events to the decision engine 36.6.

The decision engine 36.6 can be in communication with the filtering module 36.4 and sifted data database 38. The decision engine 36.6 can parse the relevant data from the master data database 34 by using the definitions of the filtering module 36.4. The parsed data can then be transmitted to the sifted data database 38 by the decision engine 36.6.

The sifted data database 38 can communicate with the event stream processor 36 or the decision engine 36.6 of the event stream processor 36. The sifted data database 38 can store master data database 34 processed by the event stream processor 38, identified as qualified marketing metrics. The sifted data database 38 can be a database. In the embodiment shown in the figures, the sifted data database 38 can store smart object events received from the smart object package manager 24, such as game identification, player identification, object identification, visibility time or the time an object is viewable on a screen, interaction time, interaction type, time count from first appearance of object until user interaction with object, and other data related to the smart object 24.3. The interaction time can be, for example, the time spent viewing the smart object 24.3. The interaction type can be, for example, click, closer camera view, throwing an object, an event that precedes a call to action such as a social network interaction. This can be considered "raw" event data that will be stored in master data database 34, however some of this data might also be present in sifted data database 38 depending on the level of detail to be included in advertiser dashboard metrics data 42.

Returning to FIGS. 1a and 1b, the system 10 can include the advertiser dashboard metrics data database 42. The advertiser dashboard metrics data database 42 can be in communication with the sifted data 38, the advertiser dashboard 16, BIND engine 40, and BIND data database 41. The advertiser dashboard metrics data database 42 can include data made available from the sifted data database 38 and the BIND data database 41 for the advertiser dashboard 16 for the purpose of analytics reporting. The advertiser dashboard metrics data database 42 can be in communication with the BIND engine 40 to determine when a marketing campaign has been completed. The qualified marketing metric can, in turn, trigger a reward to a user via the rewards system 33 if the user or user's interaction initiated the qualified marketing metric. For example, a user can be awarded a reward such as, but not limited to unlocking restricted game level, virtual goods, coupons for real stores that are associated with the marketing, downloadable content such as music, books, screensavers, wallpapers, ringtones, video clips, movies. The advertiser dashboard metrics data database 42 can be in form of a network-accessible database.

The developer dashboard metrics data database 44 can be in communication with master data database 34 and developer dashboard 25. The developer dashboard metrics data database 44 can include data made available for the developer dashboard 25 for the purpose of analytics reporting of smart object performance data and participation in advertiser marketing campaigns. Also, developer dashboard metrics data database 44 can be in form of a network-accessible database.

The developer profile save data 45 can be in communication with the registration data database 14, the developer dashboard 25, and the advertiser dashboard 16. The developer profile save data database 45 can store developer defined categories associated with a game. The developer defined categories can include the type of game, the genre, rating, target audience, screen shot, and other categories related to a game. The developer profile save data database 45 can be in form of a network-accessible database.

The advertiser dashboard save data database 48 can be in communication with the advertiser dashboard 16. The advertiser dashboard save data database 48 can receive data from the advertiser dashboard 16 concerning a product, a product line, a brand, or a marketing campaign associated with a smart object 24.3. The advertiser dashboard save data 48 can be in form of a network-accessible database.

The asset switch system 46 can be in communication with the asset repository 50, the smart object package manager 24, the advertiser dashboard 16, and the BIND engine 40. The asset switch system 46 can receive and process an electronic signal transfer that can change the attributes of a smart object 24.3. The attributes of a smart object 24.3 that can be changed include, but are not limited to, a texture, a video, an audio, an object, and other similar changeable attributes of a smart object 24.3.

The asset switch system 46 can communicate with BIND engine 40 to determine if qualified marketing metrics have been presented and meets counter criteria. The asset switch system 46 can also communicate with the event stream processor 36 to determine if qualified user interactions have been presented and meet counter criteria. The asset switch system 46 can include a user defined counter that triggers an asset switch processor to initiate a change to an attribute of a smart object 24.3. The set of attributes can be influenced by resulting data interpreted by the BIND engine 40. For example, the counter can trigger a change in the texture, video, audio, or object related to the smart object 24.3. If a count is not defined, the smart object 24.3 can inherit a default set of attributes, such as a generic texture, video, audio, or some other attribute.

The asset repository 50 can be in communication with the asset switch system 46 and the advertiser dashboard 16. The asset repository 50 can be a storage location from which brand related assets may be retrieved and inserted into a smart object 24.3 within the entertainment interface 23. The asset repository 50 is configured to receive instructions from asset switch system 46.

The monetization system 47 can be in communication with the event stream processor 36, the developer dashboard 25, and the advertiser dashboard 16. The monetization system 47 can be a transaction and revenue system that can receive and distribute advertiser campaign revenue generated among value chain entities. For example, it is possible that the video game manufacturer Rockstar Games of the video game Grand Theft Auto® will receive a contribution from the Pepsi® company virtual marketing campaign, because it has decided to place Pepsi® smart objects into the game and have the smart objects analyzed by system 10, and a portion of the revenue that can be attributed to the marketing campaign can be distributed to Rockstar Games based on defined terms and conditions that are decided in the monetization system. Value chain entities can include the system 10, the developer, and the distributor. The campaign revenue can be defined in the advertiser dashboard 16. Monetization system 47 is also configured to be in communication with the event stream processor 36 to determine if a qualified user interaction has been satisfied. When a qualified user interaction has been satisfied, a percentage share of the campaign revenue can be allocated to each value chain entity.

As another example, Electronic Arts (EA) could have multiple brands, for example but not limited to Ford®, Mountain Dew®, HP® Desktop, Starbucks®, Tide®, or copyrighted music and video clips, and sequences of copyrighted movies, jingles, etc. in a single game. The game developer EA could earn a portion of the advertising revenues from each brand or from revenue generated based on the visualization of copyrighted material that is later purchased as defined on the terms and conditions decided in the monetization system that is based on a contract between the brand owners and the game developer EA. Yet another example, a single brand, like Coke-Cola® could advertise the brand in several different online games that are created by independent game developers. Each independent game developer could earn advertising revenue from the Coke-Cola® brand, in exchange for allowing CocaCola® placing their brand as smart objects into the games.

The system 10 can thereby be used for many real-world product and service promotion and marketing activities, either as a tool to market real products or services directly via their appearance as smart objects 24.3 in virtual environments as described above, or as a tool for market research and behavioral study on selected branded objects for products or services.

For example, a beverage company could design or modify a marketing plan for a new beverage product based on their experience they gained from system 10 and multiple users of different virtual environment video games, such as SimCity® and GrandTheftAuto®. For this purpose, owner or licensee of the new or existing beverage brand, for example a new health energy drink called "DrinkFit," contracts with video game manufacturers of SimCity® and GrandTheftAuto® to place the DrinkFit product into the game as a beverage. Assuming that DrinkFit is owned by a company having several other beverage brands, these brands could also be placed in the video games as smart objects, based on the same contract. Next, the beverage brand owning company or the game manufacturer could design a special game task for the game users that involves interaction with the beverages, for example, the avatar of the game gets thirsty and needs to still its thirst by accessing a vending machine, a counter, a store, supermarket, etc. that presents several beverages. Additional virtual marketing material, such as, but not limited to, radio commercials, television commercials, posters, labels could also appear in the video games as promotion for the new DrinkFit beverage. The virtual marketing material can be based on graphic, video and audio designs that fit the marketing plan. These additional objects could be mere visual and/or audio background, but can also be smart objects 24.3 themselves.

Thereafter, users will play the video games with the new tasks incorporated that related to the beverages, as mentioned the need of the avatar to still its thirst after a certain period of action. Next, system 10 would be able to track and store the user interaction and subsequent interactions with the smart objects 23.4, and be able to compare these interactions with the interactions with the other branded beverage smart objects. In addition, via entertainment interface 23, system 10 would be able to access for each user that engaged with the branded smart objects 24.3 his or her user profile 22. This allows generating an interest profile of the typical user that engaged in the new DrinkFit beverage, as compared to the use of the classic, already existing beverages that appeared in the video game.

Based on the thus generated interest profile of a gamer that engaged with the beverage DrinkFit, valuable marketing data can be generated for a typical target consumer for the new DrinkFit beverage in the real world. Although these marketing data is merely representative of a video gamer that may represent a limited audience for the real world marketing, with statistical analysis on the user profiles and the generated interest profile it is still possible to extrapolate indicators on the typical real world target consumers. For example, while the average gamer may be of relative young age, this general interest profile could be normalized to fit the general population demographics, as a normalized interest profile. Also, a database entry of a gamer that is nearly gaming his entire free time may be a less relevant in deciding marketing campaigns for the real world, as compared to a user that is more active in the real worlds, and therefore can be classified in a group of user of a lesser taxonomy for the statistical interpolation. Next, based on these determinations of the target consumer audience, the initial marketing plan for DrinkFit is compared to the actual user interest during the video game, and the initial marketing plan is adapted based on these results. For example, the initial marketing plan may have foreseen to sell the DrinkFit product to a target consumer that is health conscious, engages in regular leisure sports activity, in an age range from 16-45, and does not like the traditional energy drinks such as Red Bull® and Five-hour Energy® too much, due to the long term health risks and the high caffeine content, and is generally an outdoorsy person. The normalized interest profile then confirms that the average gamer is a outdoorsy person, however, the normalized interest profile also shows that the average user that engaged with DrinkFit is an extreme sports fan, is between 14-25, and is less concerned about long term health effects, the marketing plan can be adapted to better reflect this outcome. For example, the target age could be changed, appearance of the advertising material could be altered, sales distribution channels could be changed to be easier accessible to the extreme sports followers, and promotional activities could be redefined. For example, instead of initiating the product in the health-conscious Whole Foods® stores, the product could be presented at extreme sports events in urban centers, such as a BMX event, skateboarding contents, etc. Also, it is possible that a totally new marketing plan for marketing the real world is designed based on the feedback received from the virtual product launch in the video games.

Also, for additional marketing of products that already exist on the market, products could be placed into video games for online and virtual world product presence as smart objects 24.3, but the users of the video games can be rewarded by real product or service coupons and promotions that are issued to the user. For example, a game developer for the above-mentioned games could contract with PepsiCo and CocaCola company to put some of their branded beverages in the video games as smart objects, together with virtual marketing material. Also, a special game task that involves interaction with the beverages can be designed and implemented.

Next, individual gainers that interacted with a particular brand with a predetermined intensity of frequency can be rewarded by a coupon, store credit, etc. For example, a real paper coupon can be sent to the user at his real address, after a screen has prompted him to enter his real address, or his real address is available in the user profile database 22. As an alternative to the mail delivery of real coupons, some samples, for example a six-pack of cans of the promoted brand, can be directly sent to the user at his home address, or can be made available at a local store for pick-up. Special filters could also be implemented at the rewards system 33, for example that only a user that fits a certain target marketing audience gets rewarded with the coupons, based on a profile of the user from user profile database 22.

Referring to FIGS. 3a and 3b, a flow chart of game flow of information is shown. The communication paths that are relevant are shown in solid lines, while the communication paths that are not relevant for the game flow of information are shown with dotted lines. In the embodiment shown in the figure, the platform user registration 12 can be in communication with the third party network API 20 if registration is completed through the social network. Alternatively, the platform user registration 12 can be in communication with the user dashboard 22 if registration is completed through the system 10. Whether registration is completed through the social network or registration is completed through the system 10, the platform user registration 12 can be in communication with the registration data database 14.

The user dashboard 22 can be in communication with the registration interface 12, the entertainment interface 23, and the rewards system 33. The entertainment interface 23 can be in communication with the smart object package manager 24. The smart object package manager 24 can be in communication with the asset switch system 46. The asset switch system 46 can be in communication with the asset repository 50. The smart object package manager 24 can also be in communication with the entertainment interface save data 32 and the master data database 34. The rewards system 33 can be in communication with the rewards system data 35.

As described above, the master data database 34 can be in communication with the event stream processor 36. The event stream processor 36 can process data from the master data database 34 to provide sifted analytics data to the sifted data database 38. The event stream processor 36 can also be in communication with the sifted data database 38. The sifted data database 38 can be in communication with the advertiser dashboard metrics data database 42. The advertiser dashboard metrics data database 42 can be in communication with the advertiser dashboard 16, BIND engine 40, and BIND data database 41. The master data database 34 can be in communication with developer dashboard metrics data database 44. The developer dashboard metrics database 44 can be in communication with the rewards system 33.

Figure 4:
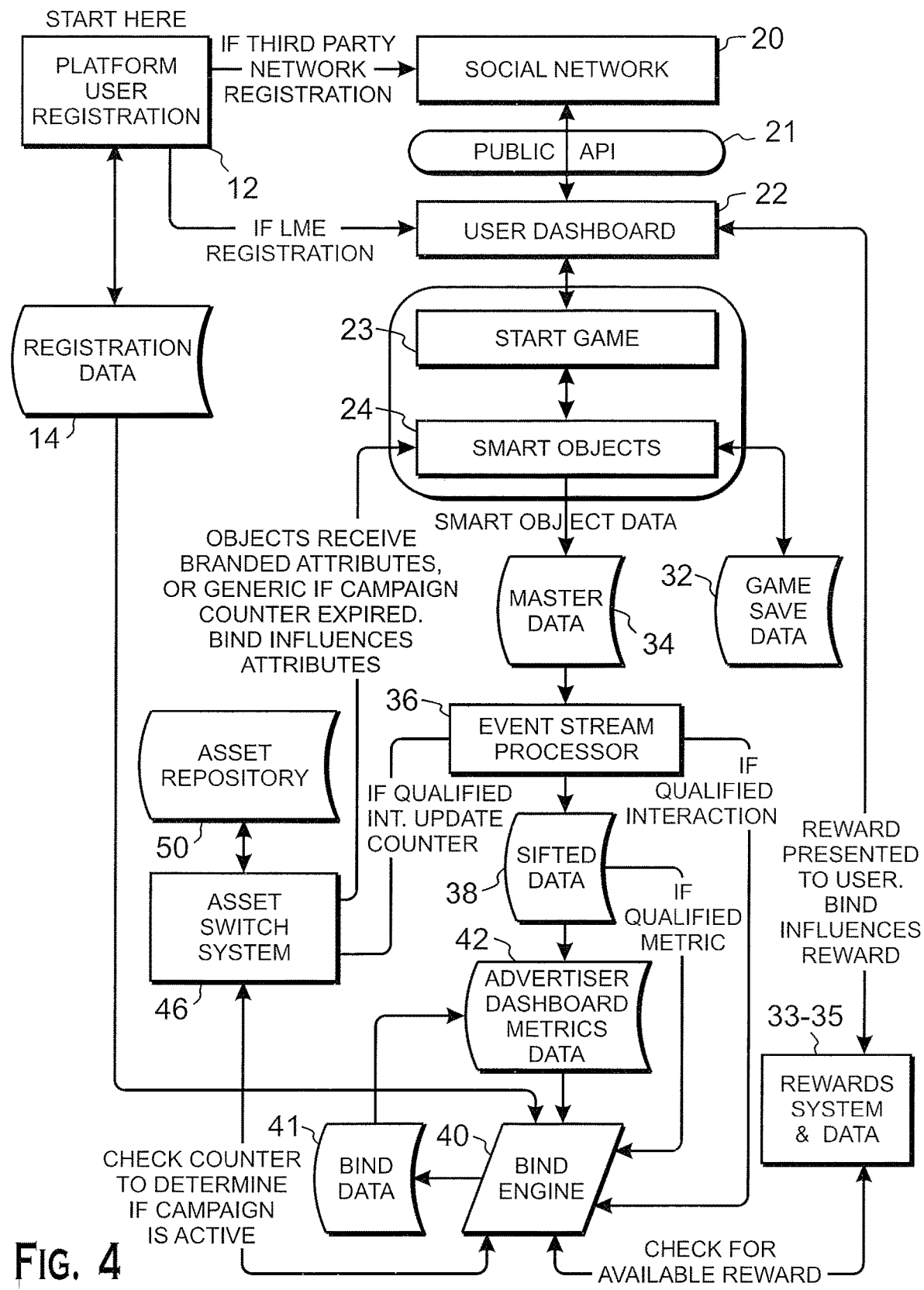
FIG. 4 is a flowchart illustrating game walkthrough in the exemplary embodiment shown in FIGS. 1a and 1b.

Referring to FIG. 4, a flow chart illustrating game walkthrough is shown. In the embodiment shown in the figure, to begin a game, a user can begin with the platform user registration 12. The platform user registration 12 can be in communication with the registration data database 14. If the registration is completed through a social network, the platform user registration 12 can be in communication with the third party network API 20, which can be in communication with the user dashboard 22 through the public API 21. If the registration is completed through the system 10, the platform user registration 12 can be in communication with the user dashboard 22. Regardless of the path for registration, the user dashboard 22 can be in communication with the rewards system 33 which can be in communication with the rewards system data database 35.

After registration, the user dashboard 22 can also be in communication with the entertainment interface 23 to start, for example, a game. After the game has started, the smart object package manager 24 can load smart objects into the game. The smart object package manager 24 can be in communication with the asset switch system 46. The asset switch system 46 can be in communication with the asset repository 50. The smart object package manager 24 can also be in communication with the entertainment interface save data database 32.

As the user interacts with at least one of the smart objects, the at least one smart object can transmit smart object data to the master data database 34. The event stream processor 36, which can be in communication with the master data database 34, can analyze the master data to provide qualified user interactions data to the BIND engine 40 or asset switch system 46, or sifted analytics data to the sifted data database 38.

The sifted data database 38 can transmit the sifted analytics data to the advertiser dashboard metrics data database 42 or the BIND engine 40. The advertiser dashboard metrics data database 42 can be in communication with the BIND engine 40, or BIND data database 41, or all of the aforementioned.

The BIND engine 40 can be in communication with the asset switch system 46. The BIND engine 40 can also be in communication with the asset repository 50.

Figure 5B:
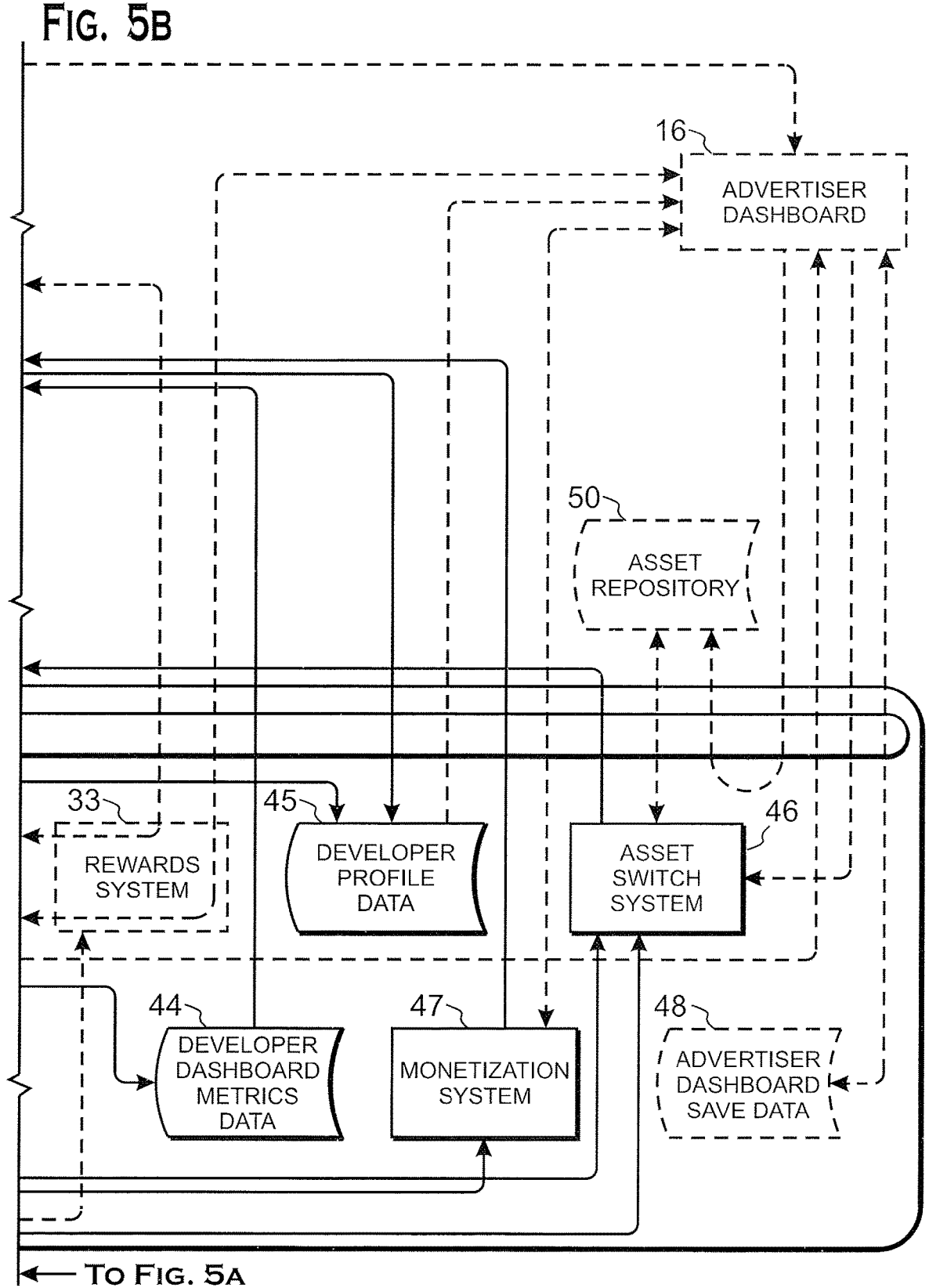

Referring to FIGS. 5a and 5b, a flow chart of developer flow of information is shown. The communication paths that are relevant are shown in solid lines, while the communication paths that are not relevant for the developer flow of information are shown with dotted lines. In the embodiment shown in the figure, the platform user registration 12 can be in communication with the developer dashboard 25 because the registration is a developer registration. The platform user registration 12 can also be in communication with the registration data database 14. The registration data database 14 can be in communication with the developer profile data database 45.

The developer dashboard 25 can be in communication with the developer profile data database 45, the entertainment interface 23, the developer dashboard metrics data database 44, and the monetization system 47.

The entertainment interface 23 can be in communication with smart object package manager 24, which can be in communication with the entertainment interface save data database 32, the master data database 34, the BIND engine 40, and the asset switch system 46 through the private API 31. The master data database 34 can be in communication with the event stream processor 36, which can be in communication with the sifted data database 38. The sifted data database 38 can be in communication with the advertiser dashboard metrics data database 42. The advertiser dashboard metrics data database 42 can be in communication with the monetization system 47 and the advertiser dashboard 16.

Figure 6:
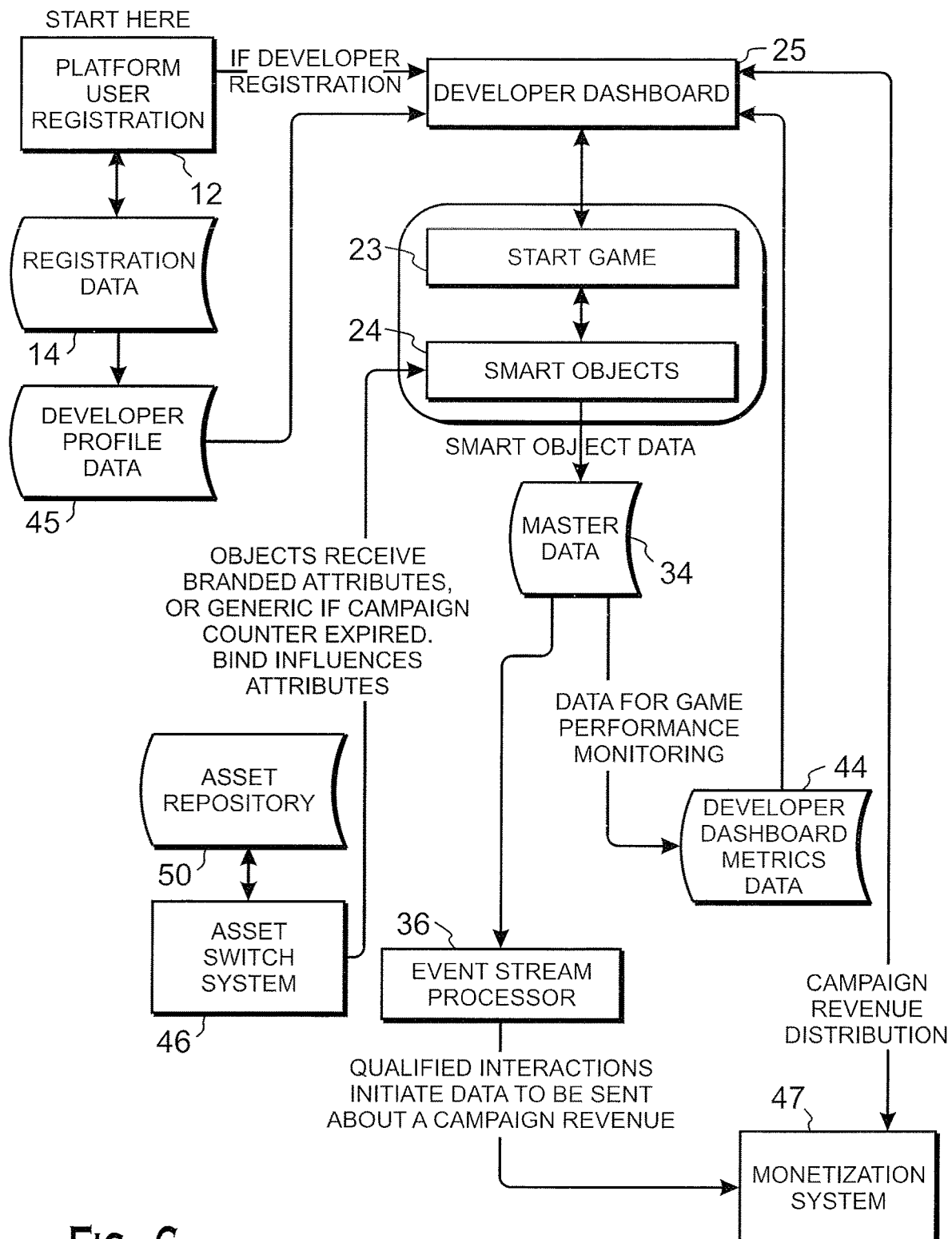
FIG. 6 is a flowchart illustrating developer walkthrough in the exemplary embodiment shown in FIGS. 1a and 1b.

Referring to FIG. 6, a flow chart illustrating developer's walkthrough is shown. In the embodiment shown in the figure, a developer user can begin at the platform user registration 12. The platform user registration 12 can be in communication with registration data database 14, which can be in communication with the developer profile data database 45. The platform user registration 12 can also be in communication with the developer dashboard 25 because the registration is a developer registration, and the developer dashboard 25 can be in communication with the developer profile data database 45. The developer dashboard 25 can also be in communication with the developer dashboard metrics data database 44 and the monetization system 47.

After registration, the developer dashboard 25 can be in communication with the game editor of the entertainment interface 23. The game editor of the entertainment interface 23 can be in communication with the smart object package manager 24, and the smart object package manager 24 can be in communication with the game save data database 32 and the asset switch system 46. The asset switch system 46 can be in communication with the asset repository 50, the advertiser dashboard 16, the developer dashboard metrics data database 44, and the monetization system 47.

The smart object package manager 24 can also be in communication with smart object data. The smart object data can be in communication with the master data database 34, which can be in communication with the event stream processor 36 and sifted data database 38. The sifted data database 38 can be in communication with the advertiser dashboard metrics data database 42, which can be in communication with the BIND engine 40, the advertiser dashboard 16, the monetization system 47, and the developer dashboard 25. The monetization system 47 can be in communication with the advertiser dashboard metrics data database 42, the advertiser dashboard 16, and the developer dashboard 25. For example, in a game play scenario a first person shooter must drive a car to proceed in a game by choosing an automobile among a choice of various brands. The single interaction of selecting an automobile can be a qualified user interaction and trigger a reward to the player. The series of interactions leading up to and including the automobile choice can be identified as an advertiser metric.

Figure 7A:
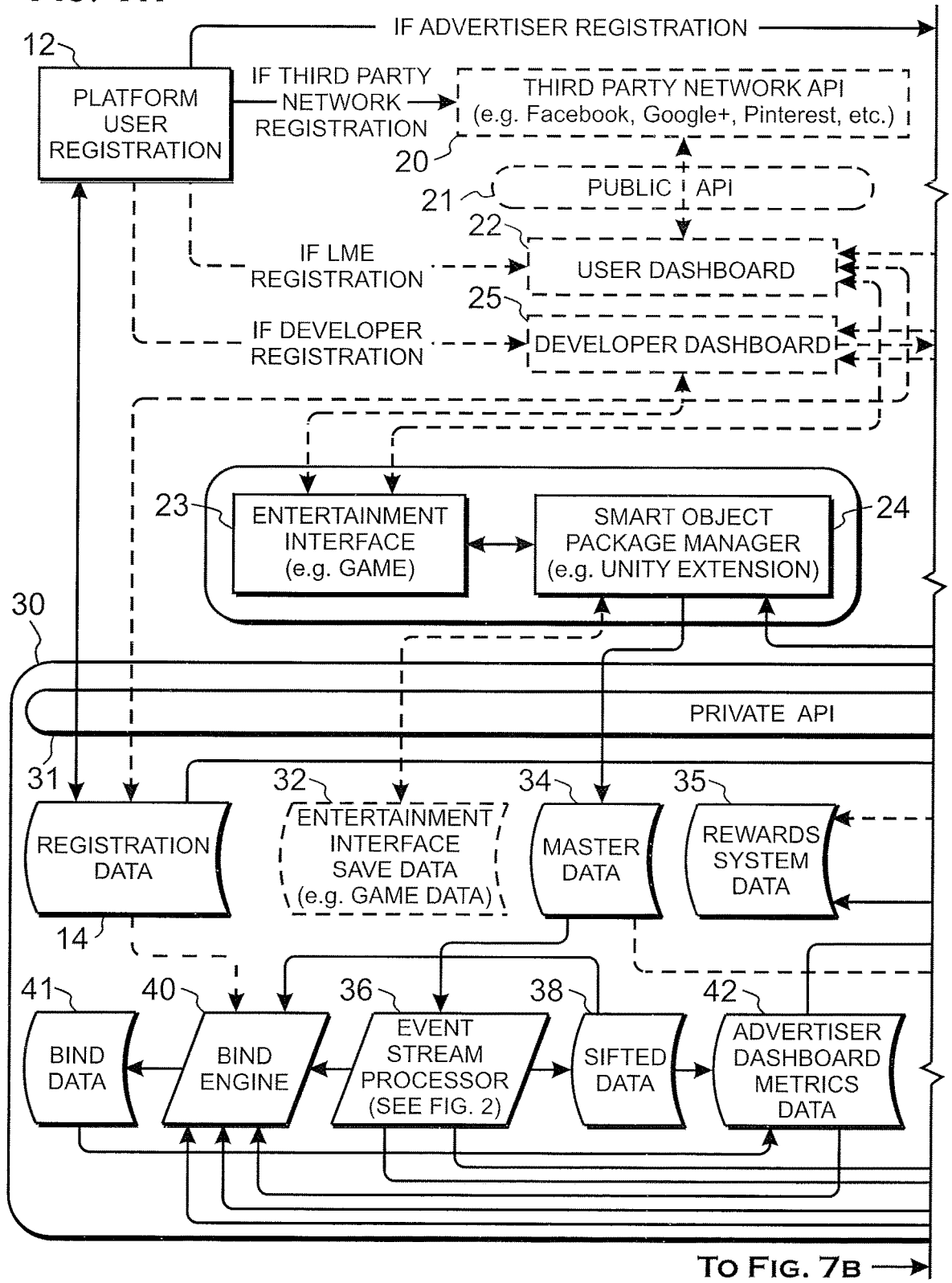
FIGS. 7a and 7b show a flowchart illustrating advertiser flow of information in the exemplary embodiment shown in FIGS. 1a and 1b.
Figure 7B:
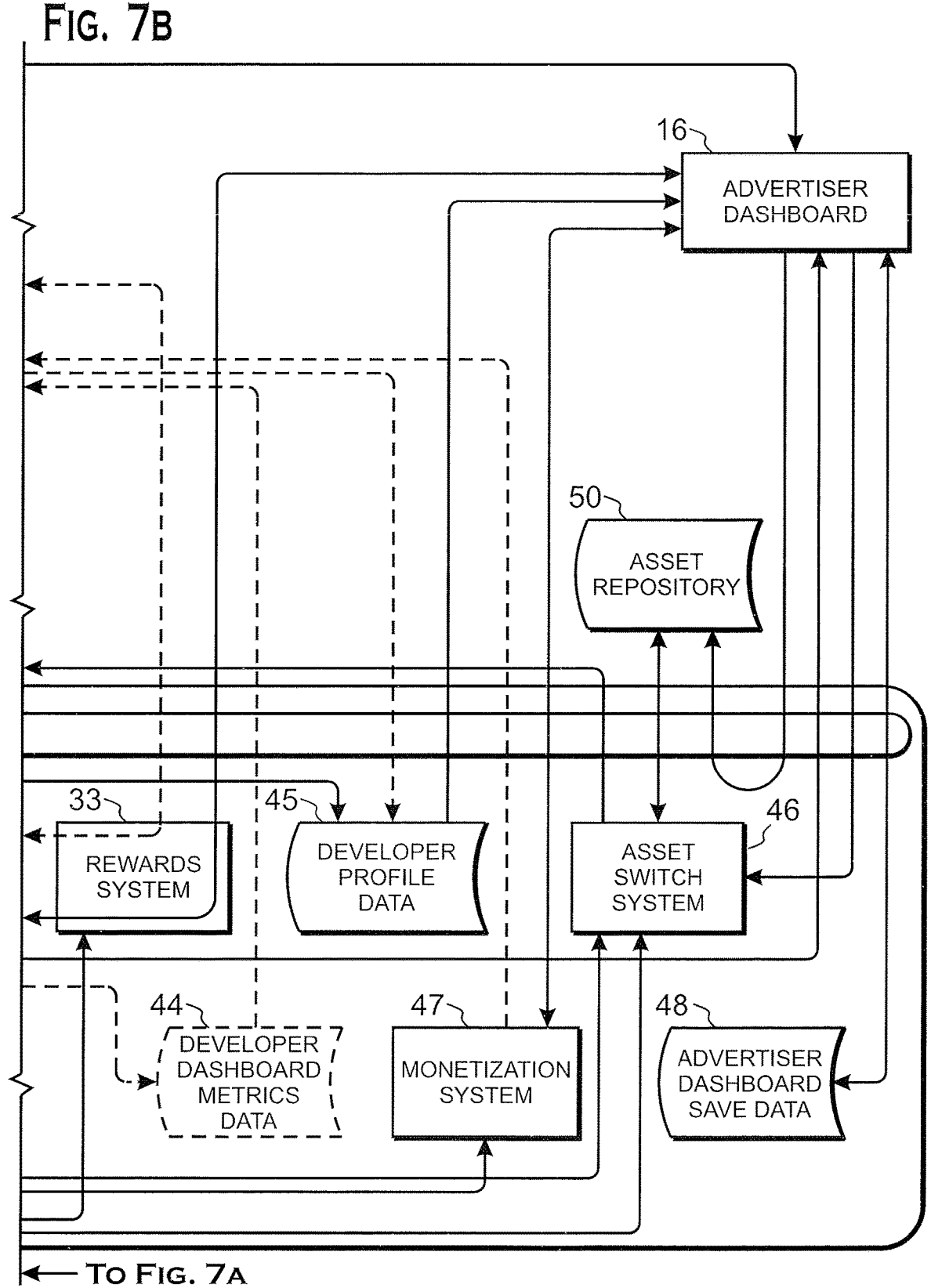

Referring to FIGS. 7a and 7b, a flow chart of advertiser flow of information is shown. The communication paths that are relevant are shown in solid lines, while the communication paths that are not relevant for the advertiser flow of information are shown with dotted lines. In the embodiment shown in the figure, the platform user registration 12 can be in communication with the advertiser dashboard 16 because the registration is an advertiser registration. The platform user registration 12 can also be in communication with the registration data database 14. The registration data database 14 can be in communication with the developer profile data database 45.

Through the private API 31, the advertiser dashboard 16 can be in communication with the advertiser dashboard save data database 48, the developer dashboard metrics data database 44, the asset switch system 46, the asset repository 50, the monetization system 47, the developer profile data database 45, and the rewards system data database 35 through the rewards system 33.

The asset switch system 46 can be in communication with the smart object package manager 24. The smart object package manager 24 can be in communication with the entertainment interface 23, the entertainment interface save data database 32, the master data database 34, and the asset switch system 46 through the private API 31. The master data database 34 can be in communication with the event stream processor 36, which can be in communication with the sifted data database 38. The sifted data database 38 can be in communication with the developer dashboard metrics data database 44. The developer dashboard metrics data database 44 can be in communication with the monetization system 47, the rewards system 33, the asset switch system 46, and the advertiser dashboard 16. The asset switch system 46 can be in communication with the asset repository 50, the advertiser dashboard 16, the developer dashboard metrics data database 44, and the smart object package manager 24. The rewards system 33 can be in communication with the rewards system data database 35, the developer dashboard metrics data database 44, and the advertiser dashboard 16.

Figure 8:
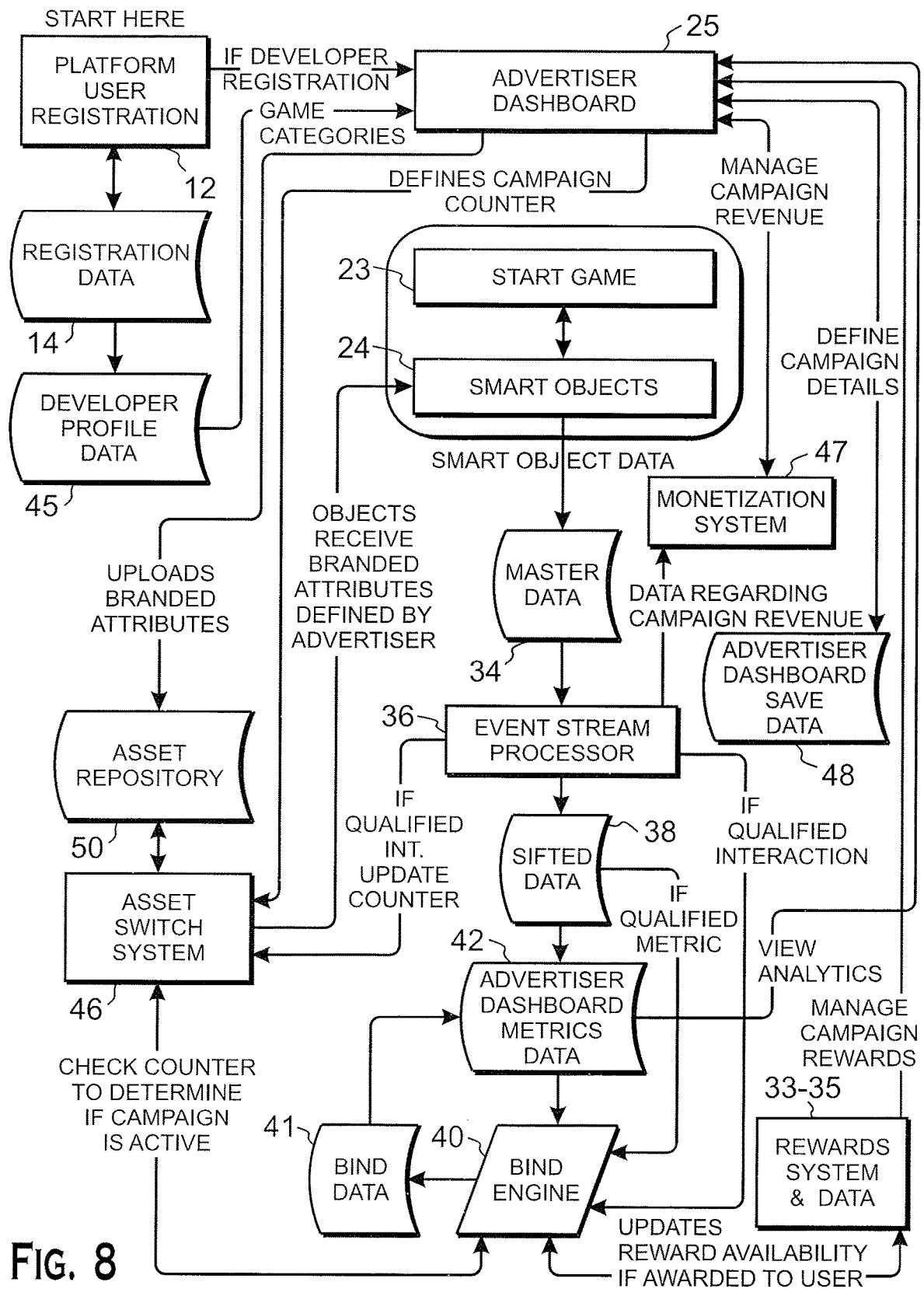
FIG. 8 is a flowchart illustrating advertiser walkthrough in the exemplary embodiment shown in FIGS. 1a and 1b.

Referring to FIG. 8, a flow chart illustrating advertiser's walkthrough is shown. In the embodiment shown in the figure, an advertiser user can begin at the platform user registration 12. The platform user registration 12 can be in communication with registration data database 14, which can be in communication with the developer profile data database 45. The platform user registration 12 can also be in communication with the advertiser dashboard 16 because the registration is an advertiser registration, and the advertiser dashboard 16 can be in communication with the developer profile data database 45.

After registration, the advertiser dashboard 16 can also be in communication with the developer dashboard metrics data database 44 and the monetization system 47. Furthermore, the advertiser dashboard 16 can be in communication with the asset switch system 46, the asset repository 50, and the advertiser dashboard save data database 48.

The developer dashboard metrics data database 44 can be in communication with the asset switch system 46, the sifted data database 38, the advertiser dashboard 16, the monetization system 47, and the rewards system 33 and rewards system data 35. The sifted data database 38 can be in communication with the event stream processor 36, which can be in communication with the master data database 34. The master data database 34 can be in communication with the smart object data, which can be in communication with the smart object package manager 24. The smart object package manager 24 can, in turn, be in communication with the entertainment interface 23, the game save data database 32, and the asset switch system 46.

An exemplary method of analyzing advertising effectiveness can include providing one or more smart objects 24.3. The method can also include inserting the one or more smart objects 24.3 into an entertainment interface 23. The method can then receive information from the one or more smart objects 24.3. The information from the one or more smart objects 24.3 can include user interactions with the one or more smart objects 24.3 and actions related to the one or more smart objects 24.3 subsequent to the user interactions with the one or more smart objects 24.3. After receiving the information from the one or more smart objects 24.3, the method can include analyzing the information for particular predetermined combinations of user interactions, actions subsequent to the user interactions, or user interactions and actions subsequent to the user interactions. If any particular predetermined combinations of user interactions, actions subsequent to the user interactions, or user interactions and actions subsequent to the user interactions are found, then the method can include providing metrics or analytics based on the found predetermined combinations of user interactions, actions subsequent to the user interactions.

Figure 9:
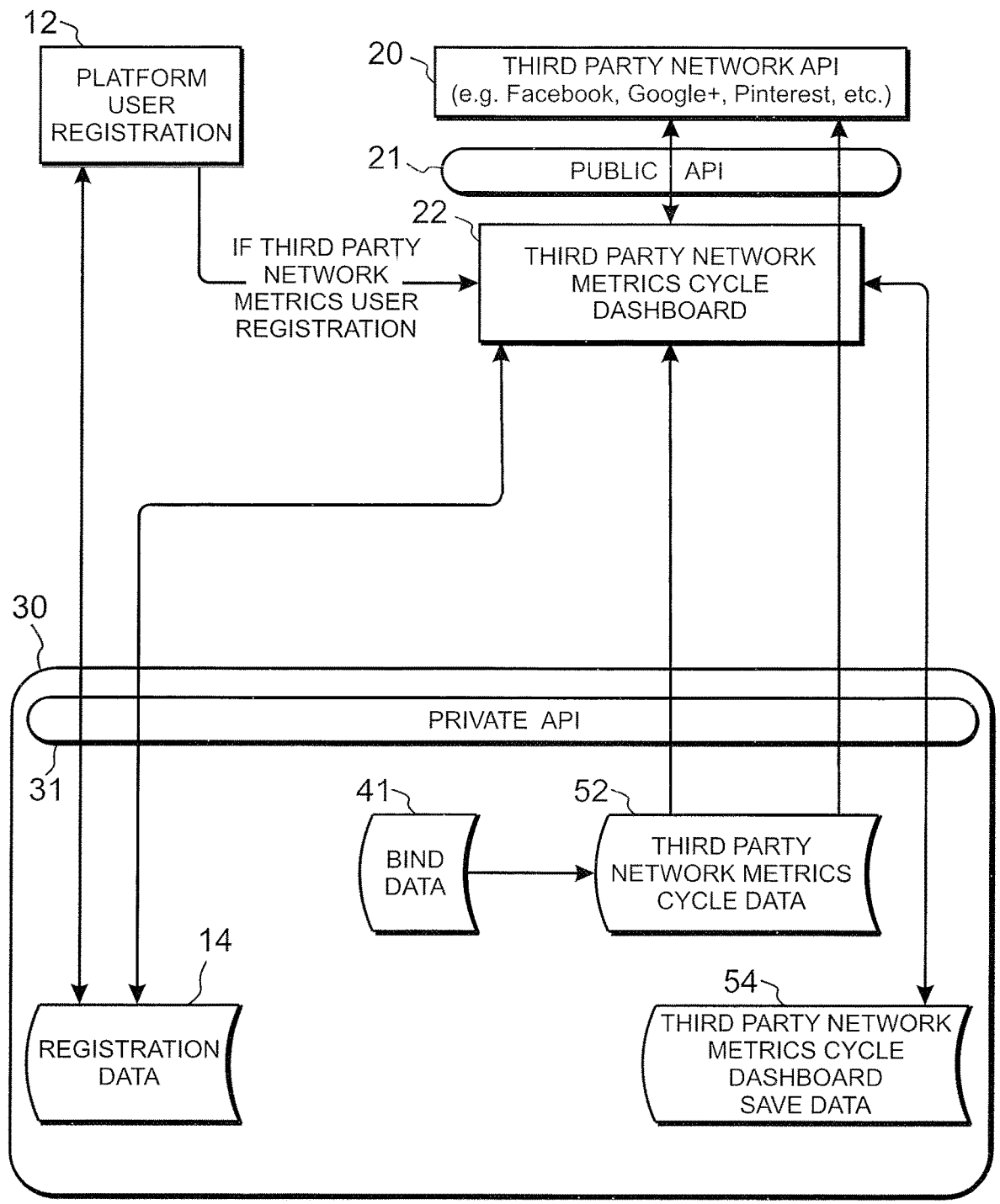
FIG. 9 is a flowchart illustrating third party network metrics overall flow of information in the exemplary embodiment shown in FIGS. 1a and 1b.

As shown in FIG. 9, the third party network metrics cycle dashboard 26 can provide an interface that presents analytics data. The third party network metrics cycle dashboard 26 can be in communication with a third party network metrics cycle data database 52. The third party network metrics cycle data database 52 can be in communication with the BIND data database 41. For example, analytics data from the BIND data database 41 can be made available to the third party network metrics metric cycle data database 26. Data may be presented to the third party network 20 via the third part network metrics cycle dashboard 26 or directly to the third party network 20 via their respective API based on the parameters defined in the third party network metrics cycle dashboard 26. The third party network metrics cycle dashboard 26 can provide an administrative console that allows viewing of user's engagement data associated with a third party network user and smart objects that has been processed by the BIND engine 40. The third party network metrics cycle dashboard 26 also allows management and defining of third party network user attributes such as but not limited to demographic and taxonomy classification, or interests such as, but not limited to, a specific brands, products, music, or movies associated with a user and smart objects 24.3. The third party network metrics cycle dashboard 26 can also be in communication with an third party network metrics cycle dashboard save data database 54 that can store parameters for managing and defining the user attributes or interests associated with a user and smart objects from a third part network 20.

The third party network metrics cycle dashboard save data database 54 can include user's demographic and personal interest parameters that may be used as a basis for defining analytics criteria. Parameters may include, but not limited to age, gender, location, educational institution, user defined groups, brand or product interests, music interests, hobbies, etc. For example, the third party metrics cycle data allows a third party network to analyze their users' engagement with a marketing campaign (brand/product, etc.) within the third party network 20 and across system 10. This cycle of data is valuable for the third party network 20 to, for instance, validate their advertisers influence on users within their platform that participate in the system. As an example, a system user may login to the system 10 via a third party network 20 such as Facebook®. The user's Facebook® profile information such as brand interest ("Likes") may influence a smart object 24.3 to take on attributes associated with that brand. If a user interacts with a branded smart object 24.3, the association of the user's interaction with the brand on the system and their affinity on Facebook® ("Like") may lead to a unique metric. Also, this data may be cycled back to Facebook® as validation of a brand's participation on one or both of the platforms.

A third party network 20 may want to analyze their users' engagement with a specific brand or product within the third party network and the system. Additionally, a third party network 20 may want to identify a group of users based on demographic data that has expressed interest in a specific brand on the third party network and has also engaged with the same brand's smart objects within the system. The third party network metrics cycle dashboard 26 can be in communication with a third party network metrics cycle data database 52. The third party network metrics cycle dashboard data database 52 can include user's interactions, behavior patterns and relationships with smart objects processed by the BIND engine or other data processed by the BIND engine.

Moreover, third party network metrics cycle dashboard 26 can also be in communication with the third party network API 20 for the purpose of a third party network metrics user to gain access to the third party network metrics cycle data 52 presented in the dashboard graphical user interface. Additionally, the third party network metrics cycle data database 52 can be in communication with the third party network API 20 for the purpose of a third party network metrics user to gain access to the third party network metrics cycle data 52 wherein data may be transmitted directly to the third party network's system.

As described above, an exemplary system 10 that analyzes advertising effectiveness can include an asset repository that stores a plurality of smart objects, an entertainment interface that accepts one or more smart objects from the plurality of smart objects, and an event stream processor that receives information from the one or more smart objects and provides metrics based on the information from the one or more smart objects. The system 10 can be constructed as a device that includes the asset repository, the entertainment interface, and the event stream processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. It will also be recognized that the terms "comprises," "comprising," "includes," "including," "has," and "having," as used herein, are specifically intended to be read as open-ended terms of art. The words "mechanism" and "element" are used broadly and are not limited to mechanical or physical embodiments, but may include software routines in conjunction with processors, etc. No item or component is essential to the practice of the invention unless the element is specifically described as "essential" or "critical". Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Also, the invention may employ any number of conventional techniques for electronics configuration, signal processing and/or control, data processing and the like. The apparatus described herein may comprise a processor, a memory for storing program data to be executed by the processor, a permanent storage such as a disk drive, a communications port for handling communications with external devices, and user interface devices, including a display, keys, etc. The memory can store one or more databases and can be, and is not limited to, any volatile or non-volatile memory device such as a flash drive, hard drive, optical drive, dynamic random access memory (DRAM), static random access memory (SRAM), and any other suitable device for storing information and later information retrieval and use for data processing. Also, the processor can include, but is not limited to, one or more hardware processors 120 for performing data processing and able to access the memory 110. The hardware processor 120 can be made of one or more central processing unit (CPU), digital signal processor (DSP), reduced instruction set computer (RISC), application specific integrated circuit (ASIC), complex programmable logic device (CPLD), field-programmable gate arrays (FPGA), parallel processor systems, or a combination of these different hardware processor types.

Figure 11:
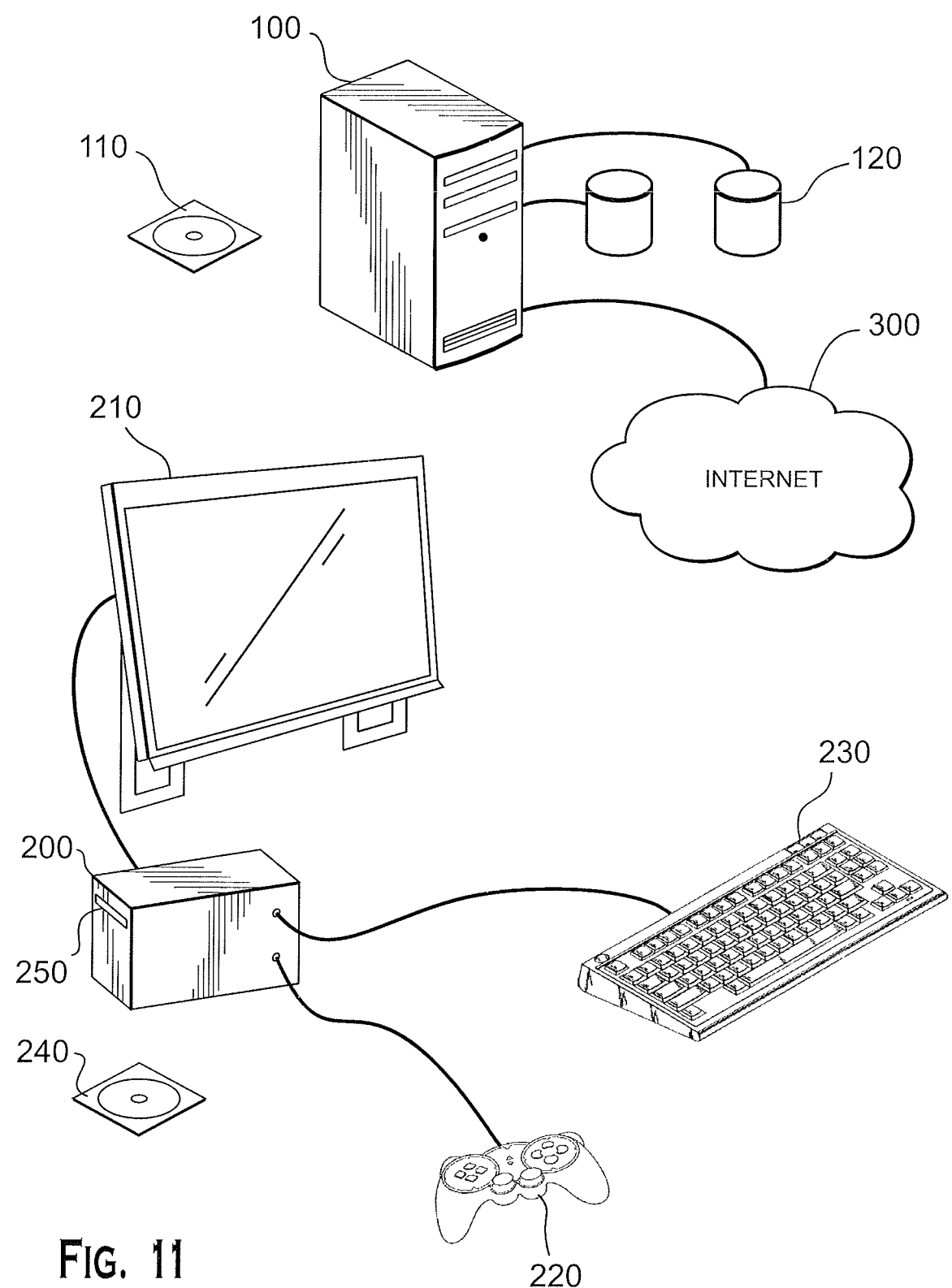
FIG. 11 shows a schematic representation of a video game console or a computer that is configured with the system of FIGS. 1a and 1b.

As shown in FIG. 11, system 10 may be operative with a real world gaming console platforms 200 such as Sony Playstation®, PC or Apple Macintosh® based software, mobile based software, or gamer network. The smart object package manager 24 may be embedded in games across multiple platforms 200 to receive, transmit, or receive and transmit directed actions to the system 10, via the Internet 300 to entertainment interface 23. System 10 can implemented on one or more servers 100 that can be located remotely from consoles 200, and may have access to various databases 120 that can store the aforementioned databases. Also, server 100 can read or have access to a data carrier 110 that may store various software elements of system 10. A game may include smart objects 24.3 by placing them inside the development environment editor. A game may be compiled to include wireframe assets with a default set of attributes such as a texture to accommodate games lacking an available Internet connection to retrieve a texture from the system asset repository 50. A game may include a local storage area on the gaming console, PC, Apple Macintosh®, mobile or gamer network device to store smart object 24.3 data prior to transmitting to the system 10. As further shown in FIG. 11, console 200 may be equipped with keyboard 230 and game controller 220 for user interaction, and the game itself may be installed from a data carrier 240, such as a CD-ROM, DVD-ROM, BlueRay disk, etc. via disk drive 250. It is also possible that the game is downloaded from the Internet 300. Display 210 is can be used for displaying the game or the virtual environment while the smart objects 24.3 are used.

Where software modules are involved, for example but not limited to the BIND engine 40, event stream processor 36, rewards system 33, smart object package manager 24, entertainment interface 32, these software modules may be stored as program instructions or computer readable code executable by the processor on a non-transitory computer-readable media, random-access memory (RAM), read-only memory (ROM), CD-ROMs, DVDs, Blu-ray, magnetic tapes, hard disks, floppy disks, and optical data storage devices. The computer readable recording media may also be distributed over network coupled computer systems so that the computer readable code is stored and executed in a distributed fashion. This media can be read by the computer, stored in the memory, and executed by the processor. Where elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Functional aspects may be implemented in algorithms that execute on one or more processors. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

While the present invention has been particularly shown and described with reference to exemplary embodiments thereof, it will be understood that numerous modifications and adaptations will be readily apparent to those of ordinary skill in this art without departing from the spirit and scope of the present invention as defined by the following claims. Therefore, the scope of the invention is defined not by the detailed description of the invention but by the following claims, and all differences within the scope will be construed as being included in the invention.

The invention claimed is:

1. A system, comprising:
a memory device;
a processing system comprising at least one hardware core, coupled to the memory device, wherein the processing system is configured to:
retrieve, via an asset controller object at runtime initialization, an asset from a repository;
initialize the asset with attributes, wherein the attributes include at least one of a positioning coordinates or texture of the asset;
destroy the asset controller object;
use the asset in one or more smart objects;
display the one or more smart objects on a graphical user interface, wherein the one or more smart objects are at least one of an audio object, a video object, a three-dimensional (3D) object, or a two dimensional object (2D) object, and wherein the one or more smart objects can record different types of interaction with a user and transmit user interaction information;
analyze user interaction transmitted by the one or more smart objects using an application programming interface;
determine a qualified user interaction based on the user interaction, the qualified user interaction further determined by comparing the user interaction to qualified metric results;
receive the qualified user interaction and determine whether an advertising campaign has completed by comparing the qualified user interaction to a qualified marketing metric; and
initiate a change to the attributes of the asset within one or more smart objects based on traits of the user, wherein the change to the attributes is based on a pattern that emerges from the traits;
wherein the system is configured to analyze advertising effectiveness of an advertising campaign.

2. The system of claim 1, wherein a first user action followed by a second user action is a metric for effectiveness of advertising.

3. The system of claim 2, wherein the first user action is an initial user interaction with the one or more smart objects and the second user action includes expressing an opinion that is at least one of commenting about the one or more smart objects, performing a series of interactions with the one or more smart objects, inviting friends in a social network to perform a series of interactions with the one or more smart objects, or request association of a brand with the one or more smart objects.

4. The system of claim 1, wherein the smart objects can be labeled with a brand of a product.

5. The system of claim 1, wherein at least one attribute further includes at least one of a audio, video, or supplemental scripts attribute.

6. The system of claim 1, further configured to:
automatically initiate marketing optimization processes based on interactive conditions in order to preserve or improve marketing objective results.

7. A method, comprising:
retrieving, by a computing device, an asset from a repository, wherein the asset is received at runtime initialization by an asset controller object;
initializing the asset with attributes, wherein the attributes include at least one of a positioning coordinates or texture of the asset;
destroying the asset controller object;
using the asset in one or more smart objects;
displaying the one or more smart objects on a graphical user interface, wherein the one or more smart objects are at least one of an audio object, a video object, a three-dimensional (3D) object, or a two dimensional object (2D) object, and wherein the one or more smart objects can record different types of interaction with a user and transmit user interaction information;
initiating a change to attributes of the asset within one or more smart objects based on traits of the user, wherein the change to the attributes is based on a pattern that emerges from the traits of the user;
analyzing user interaction information transmitted by the one or more smart objects using a application programming interface;
determining a qualified user interaction based on the user interaction information, wherein determining the qualified user interaction further includes comparing the user interaction information to a qualified metric result; and based on the qualified user interaction, determining whether an advertising campaign has completed by comparing the qualified user interaction to a qualified marketing metric;

wherein the method analyzes advertising effectiveness of an advertising campaign.

8. The method of claim 7, wherein a first user action followed by a second user action is a metric for effectiveness of advertising.

9. The method of claim 8, wherein the first user action is an initial user interaction with the one or more smart objects and the second user action includes expressing an opinion that is at least one of commenting about the one or more smart objects, performing a series of interactions with the one or more smart objects, inviting friends in a social network to perform a series of interactions with the one or more smart objects, or request association of a brand with the one or more smart objects.

10. The method of claim 7, wherein the smart objects can be labeled with a brand of a product.

11. The method of claim 7, wherein at least one attribute further includes at least one of a audio, video, or supplemental scripts attribute.

12. The method of claim 7, further comprising:
automatically initiating marketing optimization processes based on interactive conditions in order to preserve or improve marketing objective results.

13. A non-transitory computer readable medium comprising instructions which when executed by a processing system performs a method, comprising:

retrieving an asset from a repository, wherein the asset is received at runtime initialization by an asset controller object;

initializing the asset with attributes, wherein the attributes include at least one of a positioning coordinates or texture of the asset;

destroying the asset controller object;

using the asset in one or more smart objects;

displaying the one or more smart objects on a graphical user interface, wherein the one or more smart objects are at least one of an audio object, a video object, a three-dimensional (3D) object, or a two dimensional object (2D) object, and wherein the one or more smart objects can record different types of interaction with a user and transmit user interaction information;

initiating a change to attributes of the asset within one or more smart objects based on traits of the user, wherein the change to the attributes is based on a pattern that emerges from the traits of the user;

analyzing user interaction information transmitted by the one or more smart objects, wherein smart object events are transmitted using a application programming interface;

determining a qualified user interaction based on the user interaction information, wherein determining the qualified user interaction further includes comparing the user interaction information to a qualified metric result; and based on the qualified user interaction, determining whether an advertising campaign has completed by comparing the qualified user interaction to a qualified marketing metric;

wherein the processing system analyzes advertising effectiveness of an advertising campaign.

14. The non-transitory computer readable medium of claim 13, wherein a first user action followed by a second user action is a metric for effectiveness of advertising.

15. The non-transitory computer readable medium of claim 14, wherein the first user action is an initial user interaction with the one or more smart objects and the second user action includes expressing an opinion that is at least one of commenting about the one or more smart objects, performing a series of interactions with the one or more smart objects, inviting friends in a social network to perform a series of interactions with the one or more smart objects, or request association of a brand with the one or more smart objects.

16. The non-transitory computer readable medium of claim 13, wherein the smart objects can be labeled with a brand of a product.

17. The non-transitory computer readable medium of claim 13, wherein at least one attribute further includes at least one of a audio, video, or supplemental scripts attribute.

18. The non-transitory computer readable medium of claim 13, further comprising:
automatically initiating marketing optimization processes based on interactive conditions in order to preserve or improve marketing objective results.

* * * * *